United States Patent [19]

Watanabe et al.

[11] Patent Number: 4,984,076
[45] Date of Patent: Jan. 8, 1991

[54] IMAGE COMPRESSION CODING SYSTEM

[75] Inventors: Toshiaki Watanabe, Kawasaki; Fumio Sugiyama, Sagamihara, both of Japan

[73] Assignee: Kabushiki Kaisha Toshiba, Kawasaki, Japan

[21] Appl. No.: 385,437

[22] Filed: Jul. 26, 1989

[30] Foreign Application Priority Data

| Jul. 27, 1988 | [JP] | Japan | 63-185513 |
| Sep. 12, 1988 | [JP] | Japan | 63-226415 |
| Dec. 13, 1988 | [JP] | Japan | 63-312909 |
| Jan. 10, 1989 | [JP] | Japan | 1-1981 |

[51] Int. Cl.$^5$ .................. H04N 7/12; H04N 11/06
[52] U.S. Cl. ........................... 358/133; 358/12; 358/135; 358/136
[58] Field of Search ............... 358/140, 141, 135, 136, 358/12, 133

[56] References Cited

U.S. PATENT DOCUMENTS

| 4,196,448 | 4/1980 | Whitehouse et al. | 358/135 |
| 4,302,775 | 11/1981 | Widergren et al. | 358/136 |
| 4,386,366 | 5/1983 | Mori | 358/135 |
| 4,541,012 | 9/1985 | Tescher | 358/133 |
| 4,546,386 | 10/1985 | Matsumoto et al. | 358/136 |
| 4,562,468 | 12/1985 | Kofa | 358/136 |
| 4,704,628 | 11/1987 | Chen et al. | 358/135 |
| 4,734,767 | 3/1988 | Kaneka et al. | 358/135 |
| 4,757,383 | 7/1988 | Tanaka | 358/135 |
| 4,797,742 | 1/1989 | Sugiyama et al. | 358/135 |

OTHER PUBLICATIONS

W. H. Chen et al.: "Scene Adaptive Coder", IEE Trans. COM-32, No. 3, Mar., 1984.
K. Kishida et al.: "Rate-Adaptive Vector Quantization of Prediction Error Signals for Color Images", 1988 Autumn National Convention, E;C D-59, Japan.

Primary Examiner—John K. Peng
Attorney, Agent, or Firm—Oblon, Spivak, McClelland, Maier & Neustadt

[57] ABSTRACT

An image coding apparatus includes an image dividing circuit for dividing an image signal of one frame into a plurality of blocks, an amount-of-data calculator for computing the amount of data representing fineness of a picture included each block, a bit-assignment determining circuit for distributing all coding bits usable for encoding the image signal of one frame to the individual blocks, to each block a number of bits which has been determined by the amount of data of the block, a quantizer for quantizing the image signal for each block and outputting a quantization signal, and an encoder for encoding the quantization signal in accordance with the number of bits of each block determined by the bit-assignment determining circuit.

25 Claims, 15 Drawing Sheets

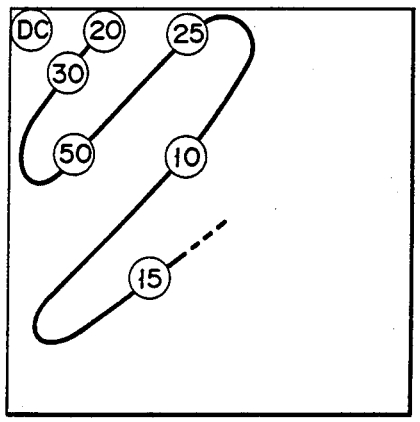
F I G. 2
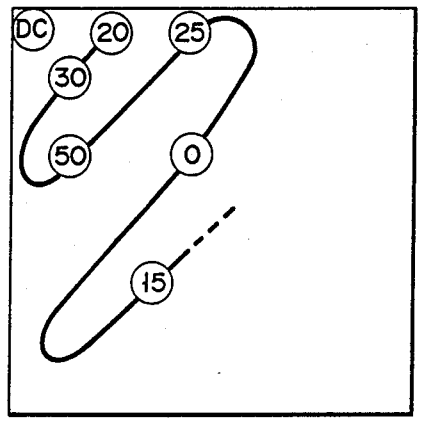
F I G. 3
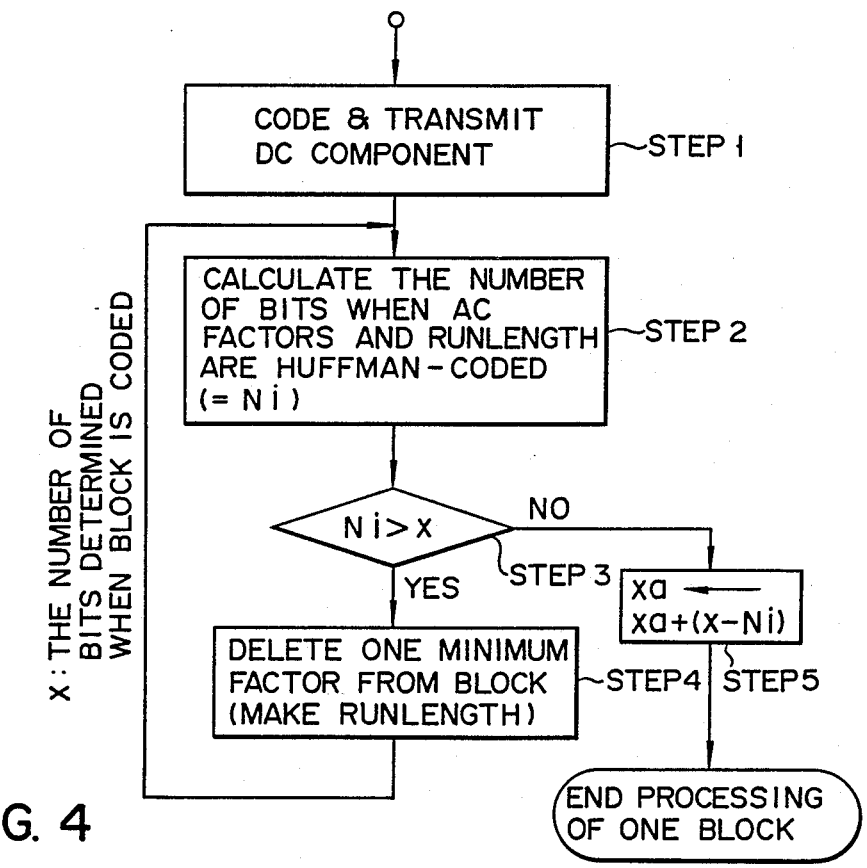
F I G. 4

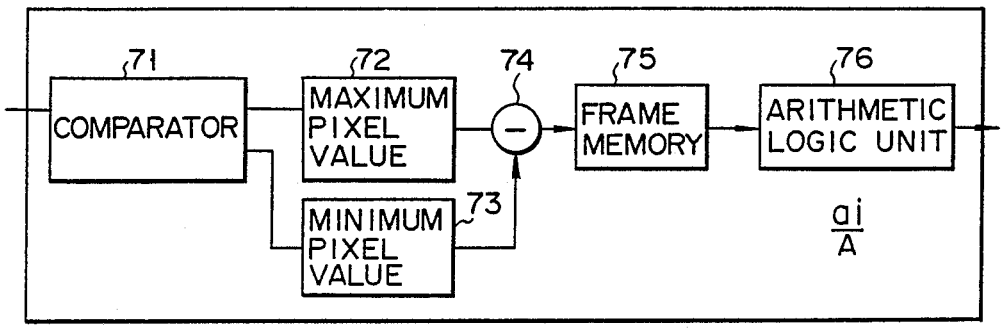
F I G. 7
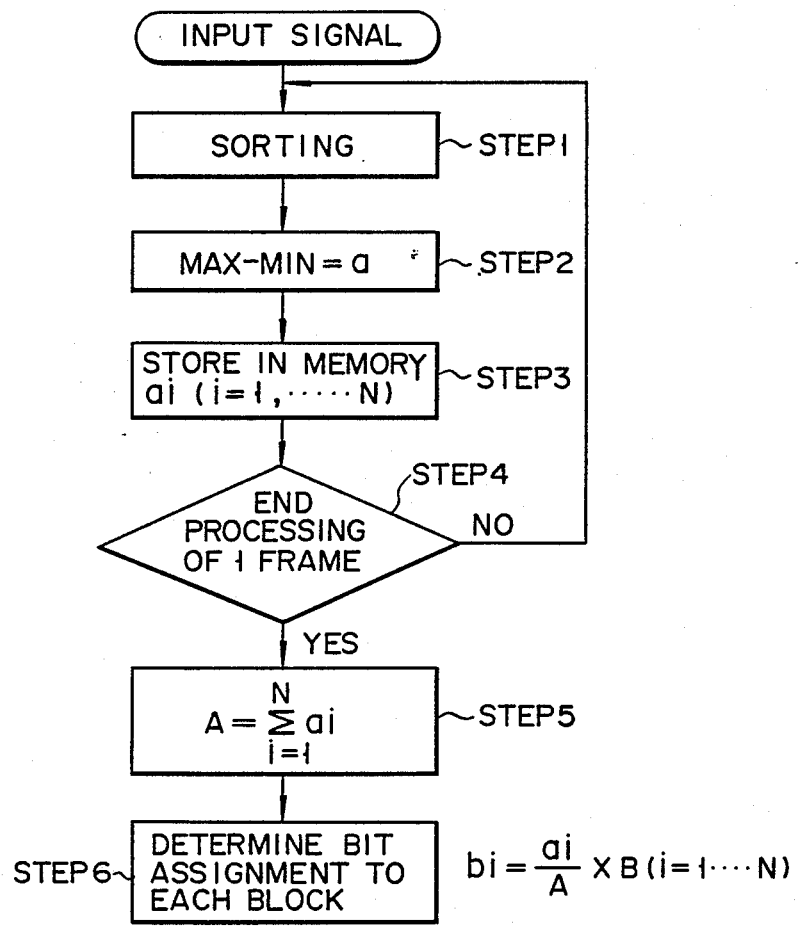
F I G. 8

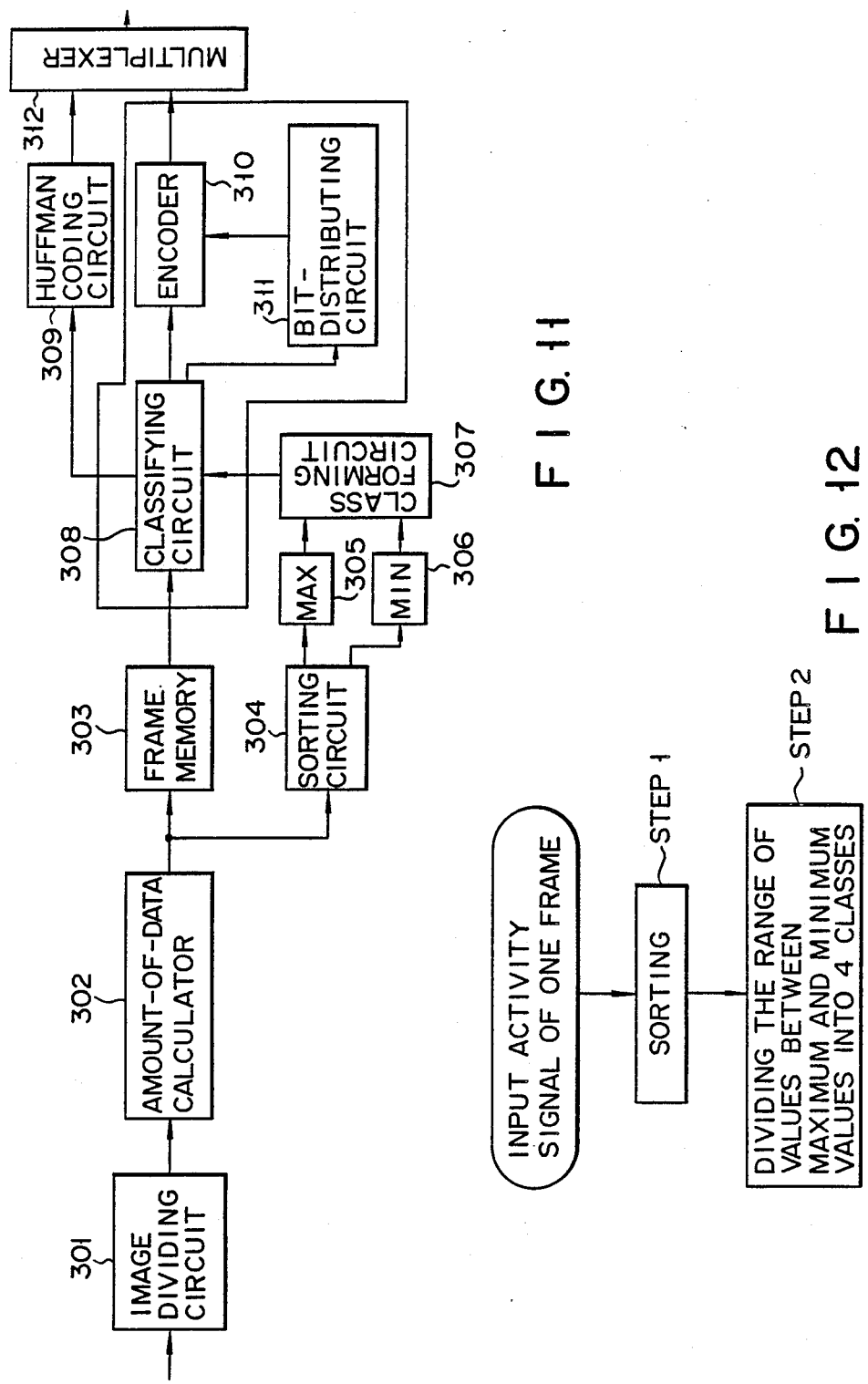
F I G. 11
F I G. 12

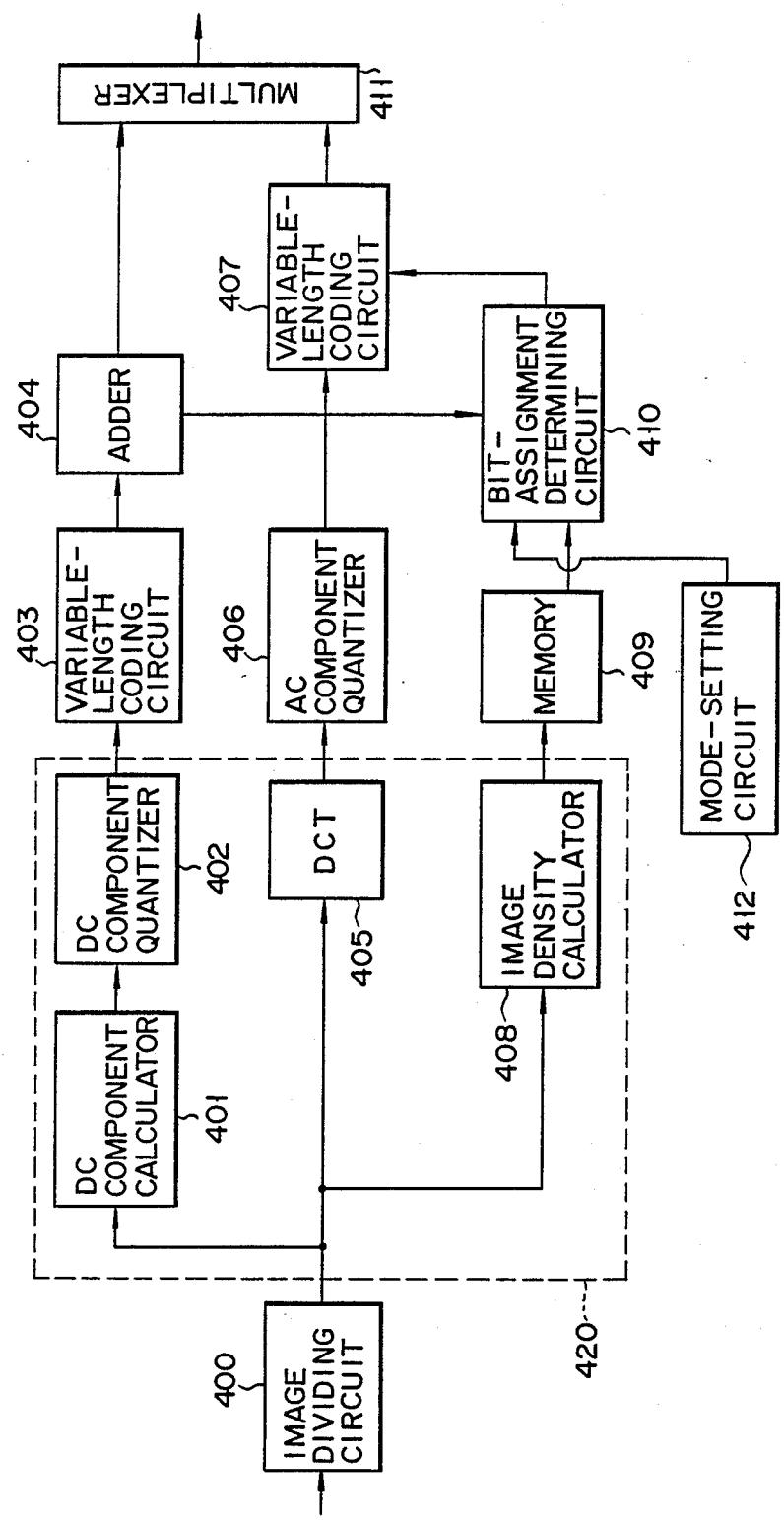
F I G. 15

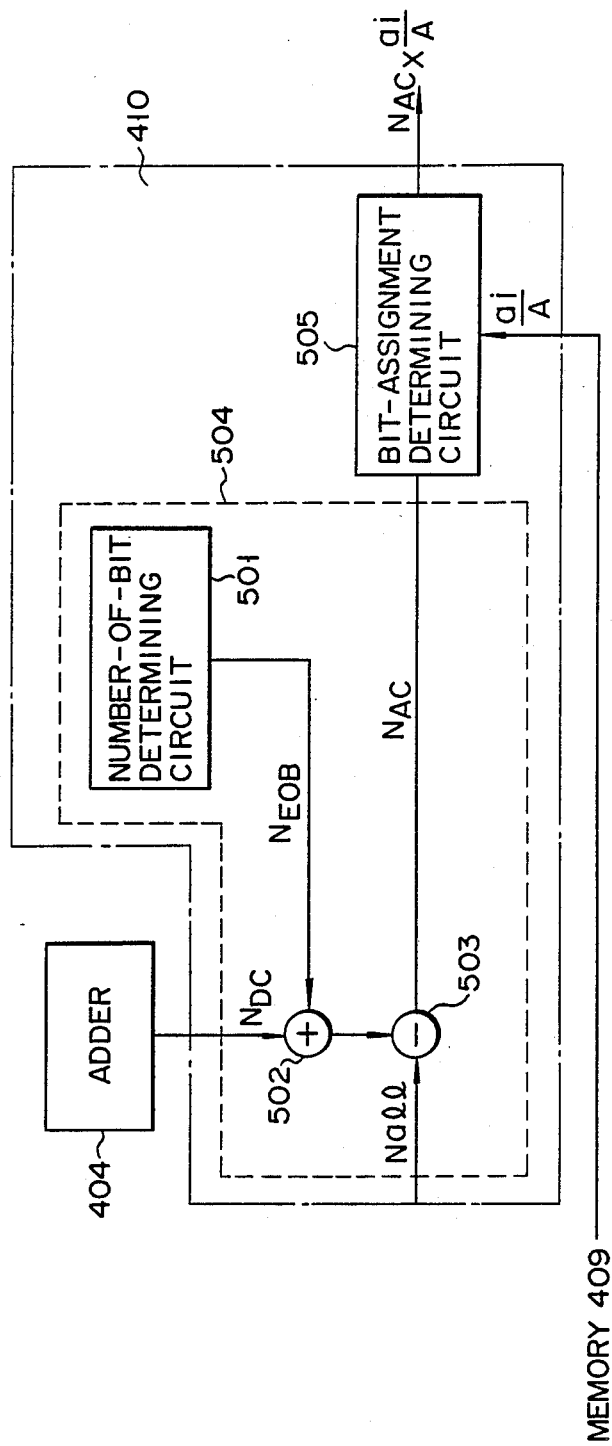
F I G. 16

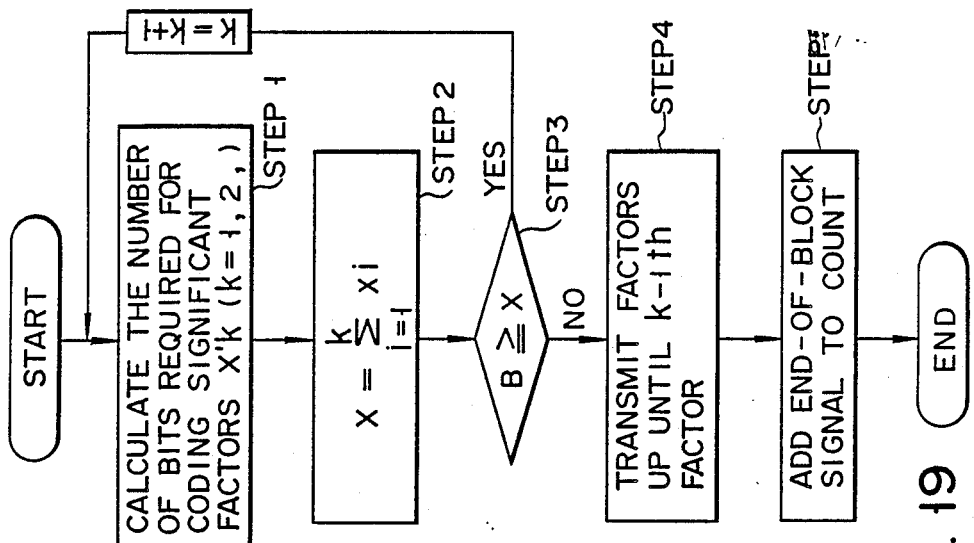
FIG. 19
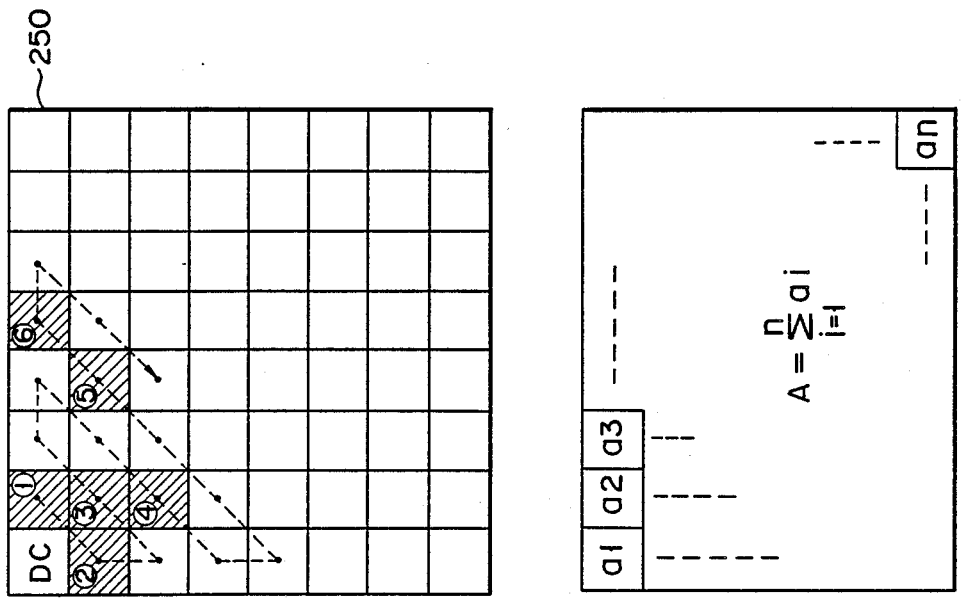
FIG. 18
FIG. 17

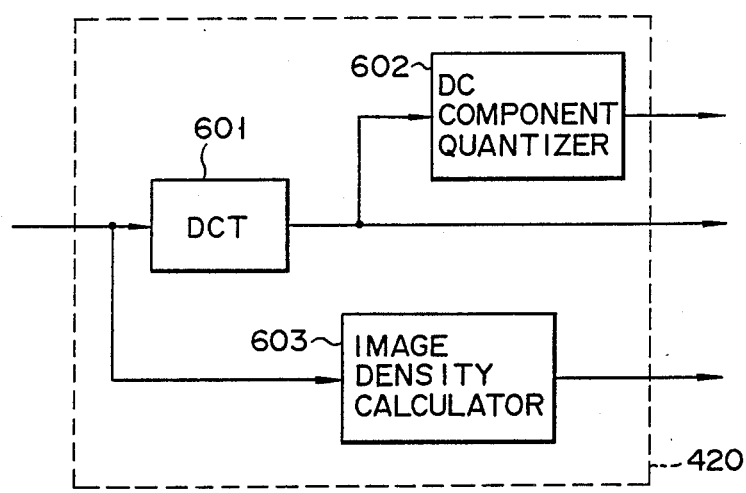
F I G. 20
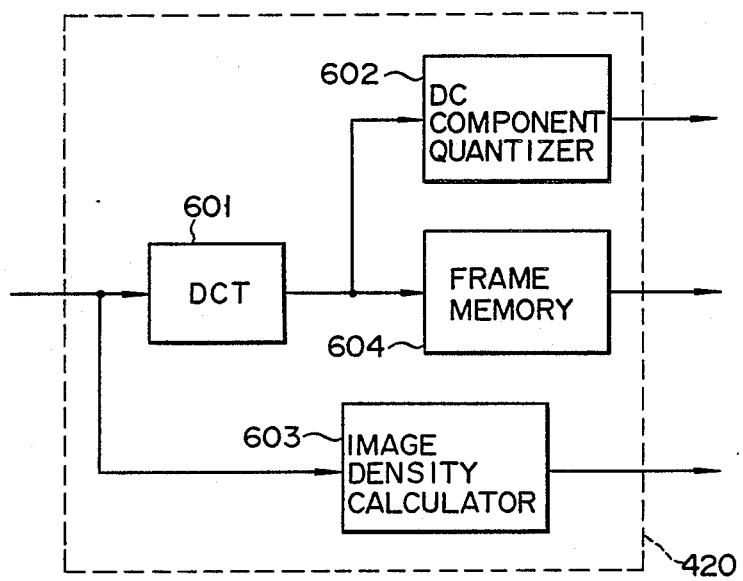
F I G. 21

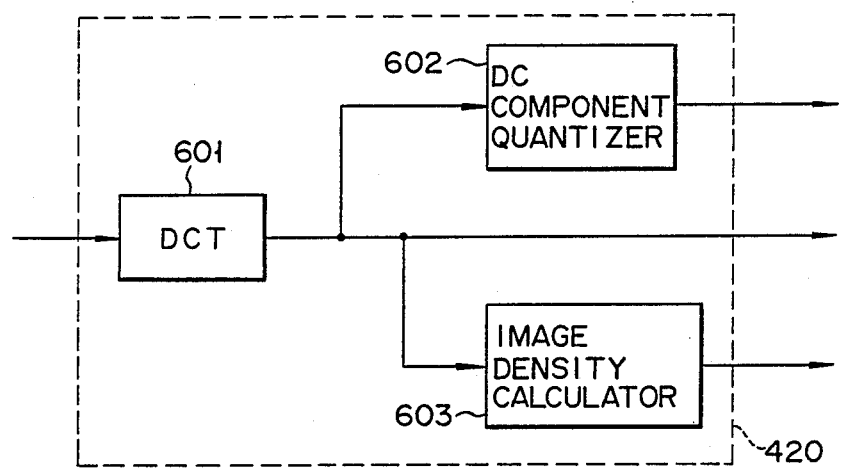
F I G. 22
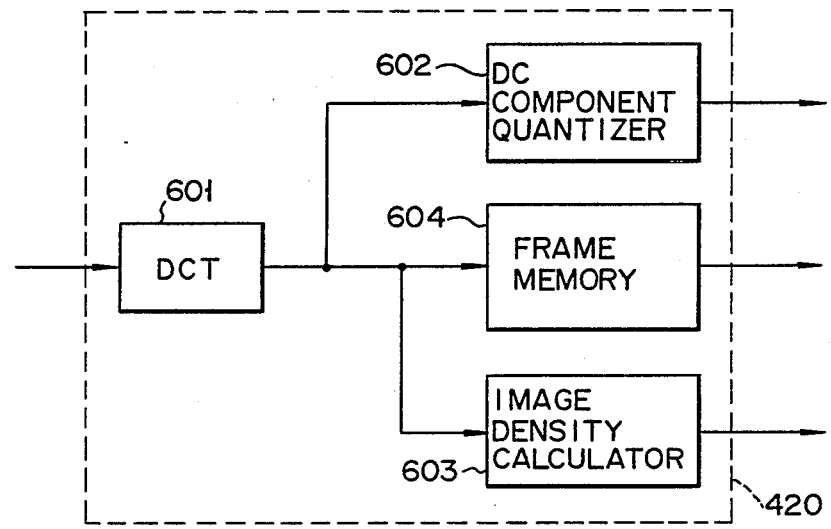
F I G. 23

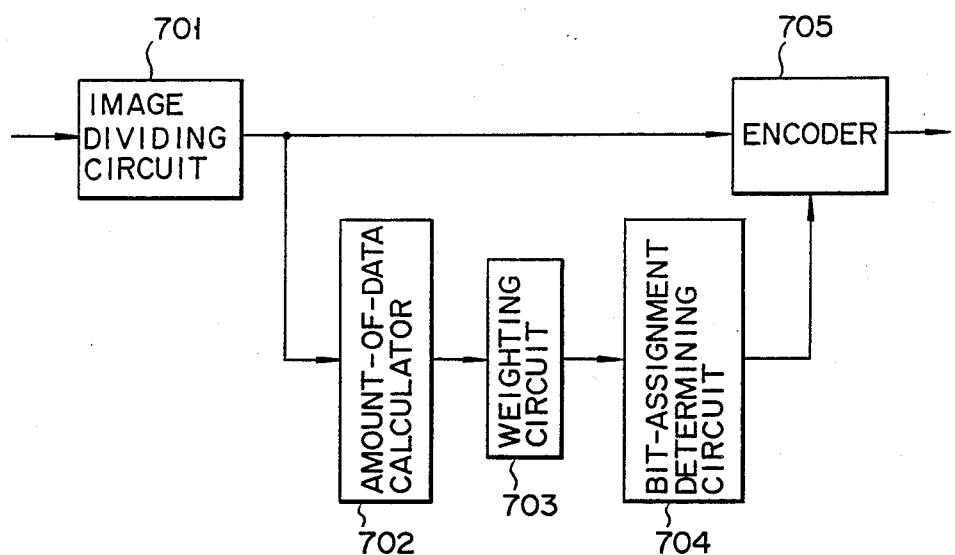
F I G. 24
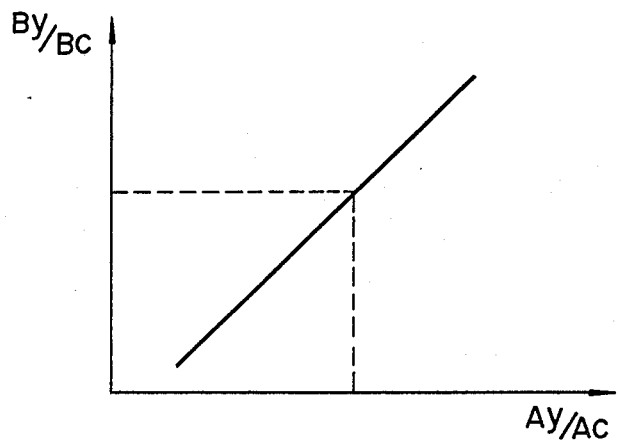
F I G. 25

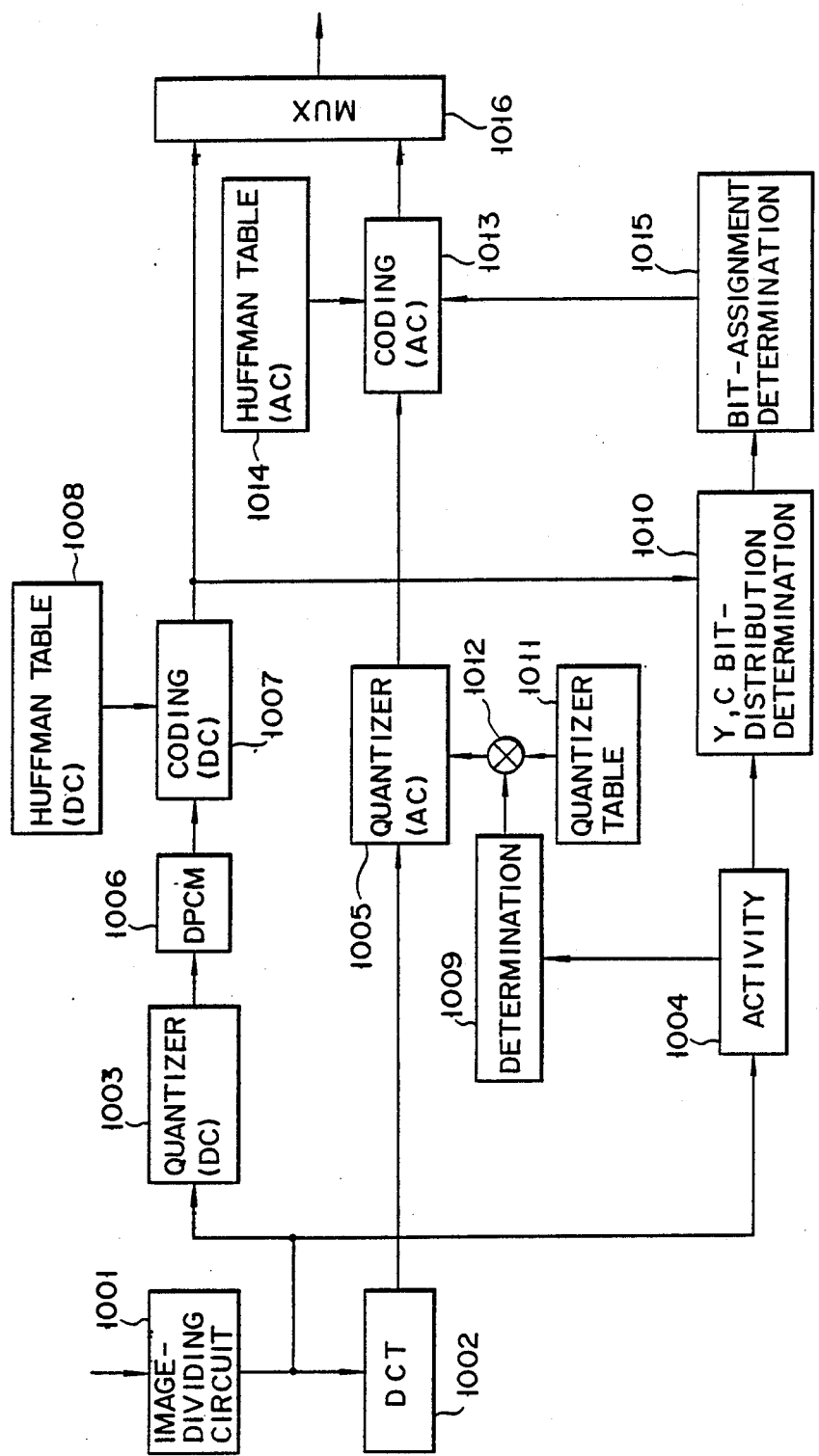
F I G. 29

IMAGE COMPRESSION CODING SYSTEM

BACKGROUND OF THE INVENTION

1. Field of the Invention

The present invention relates to an image coding system, and particularly a compression coding system of a still picture or a motion picture.

2. Description of the Related Art

With regard to compression coding of a still picture or a motion picture, there is a demand of coding one frame within a predetermined number of coding bits with higher efficiency.

To fulfill such a demand, the following methods have been taken conventionally. As the first method, given that B is the total number of bits for one frame and N is the number of blocks to be encoded within one frame, the number of bits per block is defined by B/N and a coding process is taken while executing bit adjustment in such a way that the number of bits of each block approaches B/N (see "Scene Adaptive Coder," by W. H. Chen and W. K. Pratt, IEEE Trans. COM-32, No. 3 1984). The second method is to subject each block to DCT (discrete cosine transformation), transfer only the first one of the transformation factors to be transferred, as counted from a low region, for every transfer block, then only the second transformation factor as counted from the low region and so forth, and stop this operation when a predetermined number of bits are reached.

Neither method, however, has a local property within a frame taken into consideration, thus providing a reproduced image with different coding errors for different blocks. This would increase block distortion or cause blur or the like at the edges of a fine picture image portion, thus deteriorating the image quality even from the point of subjective evaluation.

SUMMARY OF THE INVENTION

Accordingly, it is an object of this invention to provide a novel image coding system which executes the adaptive distribution of coding bits according to a local property within a frame, i.e., bit distribution proportional to the degree of fineness of a picture or the ratio of high frequency components in a frame, thereby presenting a reproduced image with a high quality as evaluated even subjectively, with less imbalance of coding errors occurring on blocks under the condition that one frame of an image is coded within a predetermined number of bits.

According to the present invention, a local property in one input frame, such as the high frequency component for each block, the standard deviation or variance of a signal level in a block, or the difference between the maximum signal level and the minimum signal level of pixels within a block, is obtained from one frame, then the total, predetermined number of bits required for coding one frame are properly allocated for each block in the frame in accordance with the local property (e.g., distribution of bits in proportion to the variance). In actual coding, that image data which is not significant in evaluating values (e.g., SNR) or from the point of subjective evaluation is omitted in order to code each block with the allocated number of bits, or image data is transferred from the most important one according to the priority. This can ensure coding of each block in accordance with the allocated number of bits and coding of the entire frame within the range of a predetermined number of bits. In other words, according to the above coding system, one frame can be coded with a predetermined number of bits and a high-quality reproduced image (evaluated subjectively) can be acquired with imbalance of coding errors suppressed as much as possible within that number of bits.

BRIEF DESCRIPTION OF THE DRAWINGS

FIG. 2 is a diagram illustrating the transformed plane after execution of a DCT;

FIG. 3 is a diagram for explaining the absolute value minimum coefficient other than 0 is replaced by 0 by carrying out a fixed-length coding process;

FIG. 4 is a flowchart illustrating for explaining an algorithm of a fixed-length coding process in a unit of one block;

FIG. 7 is a block diagram illustrating an amount-of-data calculator;

FIG. 8 is a flowchart for explaining the calculator shown in FIG. 7;

FIG. 11 is a diagram illustrating a different embodiment of the present invention;

FIG. 12 is a flowchart for explaining the embodiment shown in FIG. 11;

FIG. 15 is a block diagram of one embodiment of the present invention on a sender side;

FIG. 16 is a circuit diagram of a circuit for calculating the total number of bits allocated for coding an AC component;

FIG. 17 is a diagram illustrating a significant coefficient of a DCT transformed plane and the scanning direction;

FIG. 18 is a diagram explaining the image density of each block;

FIG. 19 is a flowchart for explaining a process of coding each block;

FIGS. 20 through 23 are block diagrams illustrating part of another embodiment of the present invention on a sender side;

FIG. 29 is a block diagram of an image coding apparatus according to a still further embodiment of the present invention.

DETAILED DESCRIPTION OF THE PREFERRED EMBODIMENTS

Figure 1:
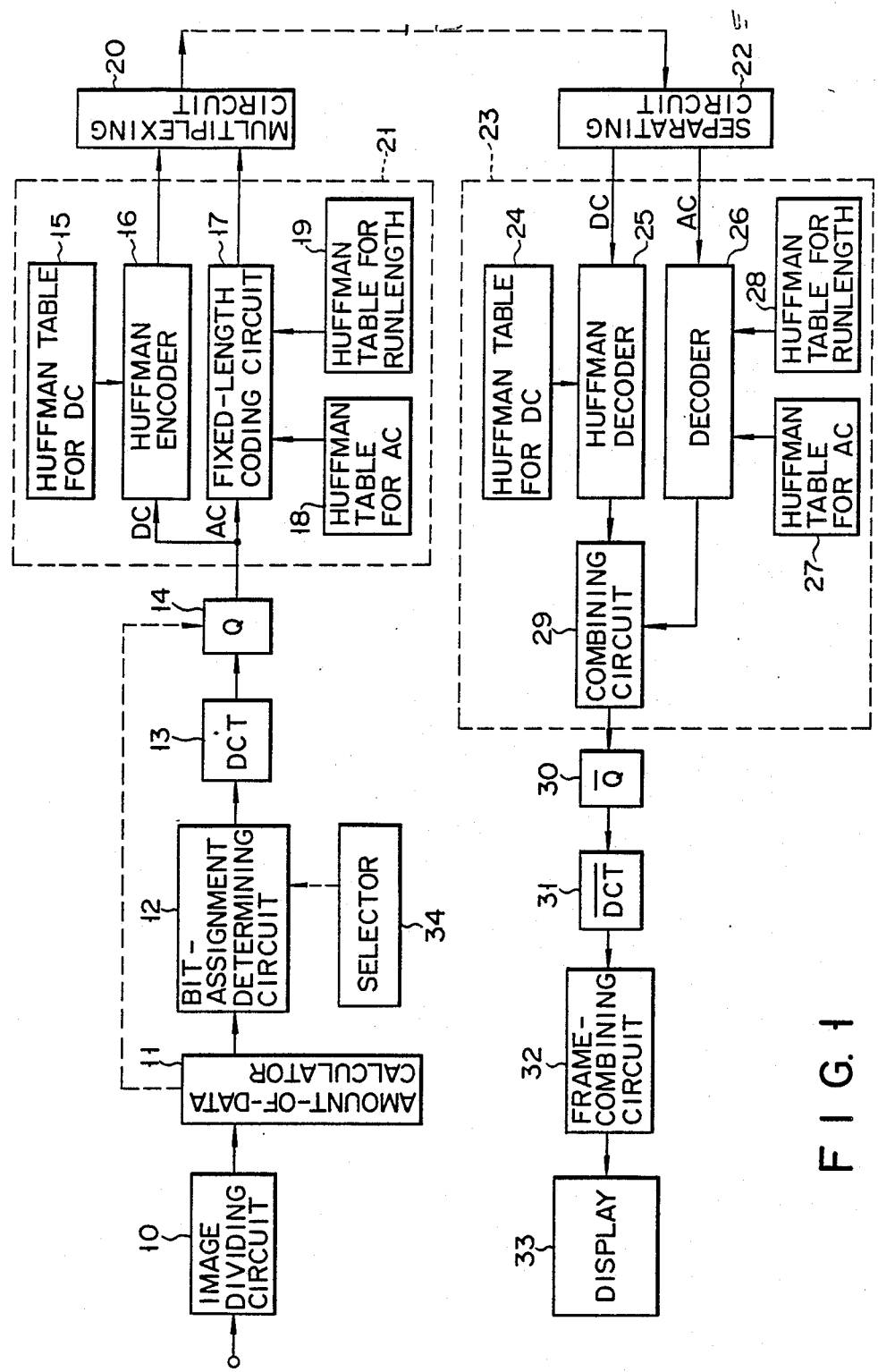
FIG. 1 is a block diagram illustrating one embodiment of the present invention.

FIG. 1 is a block diagram of the first embodiment of the present invention. An image dividing circuit 10 divides an input frame into a plurality of blocks each having a predetermined number of pixels (here 8×8 pixels, for example). This circuit 10 is coupled to an amount-of-data calculator 11. The calculator 11 computes the amount of data generated for each block (for example, determined by the variance and standard deviation of each pixel in the block or the difference between the maximum and minimum pixel values). The calculator 11 is coupled to a bit-assignment determining circuit 12. The circuit 12 assigns a predetermined, total number of bits allowed for coding of one frame, to each block. In this case, the bit assignment is performed carrying out such a process as weighting that part in which a change in luminance is gradual in proportion to the amount of generated data calculated by the calculator 11, or in such a way as to improve the visual characteristic. Through this operation the number of coding bits for each block is determined on the basis of the following equation:

$$X = A \times \frac{n}{N} \quad (1)$$

where X is the number of assigned bits for a block, A is the total number of bits usable for coding one frame, N is the total amount of the generated data of each block, and n is the amount of generated data of a given block.

The bit assignment determining circuit 12 has its output terminal coupled to a DCT (discrete cosine transformation) circuit 13 whose output terminal is coupled to a quantizer 14. The DCT circuit 13 subjects image data to DCT block by block, and the resultant coefficient is then subjected to linear quantization or non-linear quantization in the quantizer 14.

It is possible to employ the proper step size system which varies the step size of the quantizer 14 (the control along the dotted lines in the diagram) based on the total amount of generated data within one frame, computed by the amount-of-data calculator 11. In this case, however, it is necessary to transfer step size data once per frame (or the number of step sizes to be changed within one frame if such is the case). The bit-assignment determining circuit 12 may be designed so as to be able to determine the total number of bits (amount of data) usable for coding one frame, manually using an external selecting circuit 34.

The output terminal of the quantizer 14 is coupled to a fixed-length coding section 21. This section 21 separates each DCT coefficient quantized into a DC component and an AC component. The DC component is subjected to Huffman coding in a Huffman coding circuit 16 using a Huffman table 15 exclusively used for the DC component. In this case the DC component value need not be coded as it is; instead, the difference value between the DC component of the previous block and that of the present one may be subjected to the Huffman coding utilizing the correlation between blocks.

The AC component is subjected to the Huffman coding using an AC-specific Huffman table 18 for coefficient values quantized for each block and a 0 runlength-specific Huffman table 19. In this case it is assumed that when the AC components of transformation coefficients are scanned in a zigzag manner (see IEEE Trans. COM-32, No. 3. 1984) from a lower region and transferred as shown in FIG. 2 (step 1 in FIG. 4), for example, the coefficient values to be actually transferred are aligned as 20, 30, 50, 25, 10, 15, ..., and 0 runlengths exist between them. A fixed-length coding circuit 17 first computes the bit coefficient N1 required on the assumption that these AC component values and 0 runlengths are all to be transferred (step 2 in FIG. 4). If this bit number N1 has a relation $X \geq N1$ with respect to the coding bit factor X assigned to a predetermined block by the bit-assignment determining circuit 12, the AC components will be coded as they are. If $X < N1$ (step 3 in FIG. 4), however, the absolute value minimum coefficient (10 in this example) other than 0 is set to 0 as shown in FIG. 3 (step 4 in FIG. 4). Accordingly, the AC component values 25 to 15 would be one 0 runlength, and the AC component with a value "10" will not be transferred. In this state, a bit coefficient N2 for this block is again computed.

The above operation sequence is repeated; when the bit number Ni for this block finally becomes $X \geq Ni$, these coefficients and 0 runlengths are transferred using the Huffman coding.

The above embodiment employs a method of erasing AC component values from small ones as a measure to make the bit number N of a block smaller than or equal to X. Alternatively, a method of erasing AC components from high frequency components may be employed in consideration of a subjective evaluation of a reproduced image. Instead of such erasing methods, it is possible to use a method of sequentially transferring AC components from those having large values or from low frequency components and stopping the transferring operation when a transfer bit number becomes X.

In executing a fixed-length coding for each block, when X > Ni for one block (i.e., when there are X−Ni bits remaining with respect to the actual assigned number of bits), if the X−Ni bits are added to the assigned bits for the next block before executing the coding for that block, no useless bit occurs. In other words, with the number of assigned bits for the next block being Xa, Xa+(X−Ni) would be calculated from Ni obtained in step 2 in FIG. 4 (step 5) and the resultant data is used as a new Xa, thus completing the process for one block. This method can effectively assign a limited number of bits to each block. Data for each block is separated by sending an EOB (end-of-block) signal. The DC and AC components subjected to the Huffman coding in the Huffman coding circuit 16 and fixed-length coding circuit 17 are multiplexed by a multiplexer 20 and then sent to the receiver side.

Figure 5:
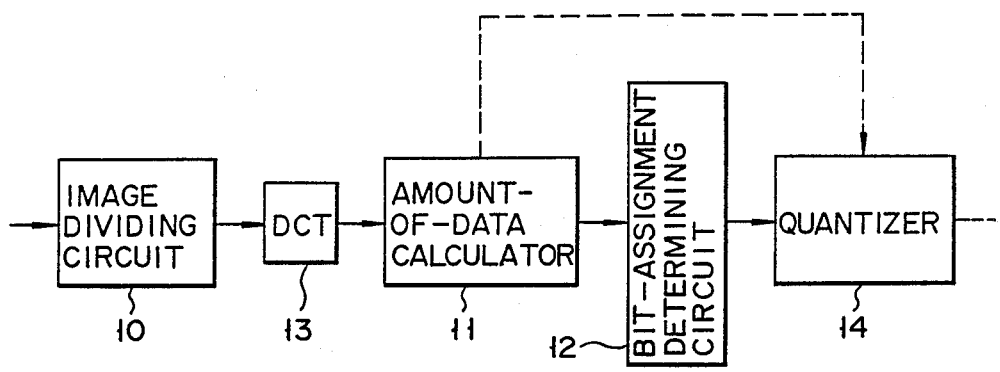
FIG. 5 is a block diagram for explaining a modification of the arrangement shown in FIG. 1.
Figure 6:
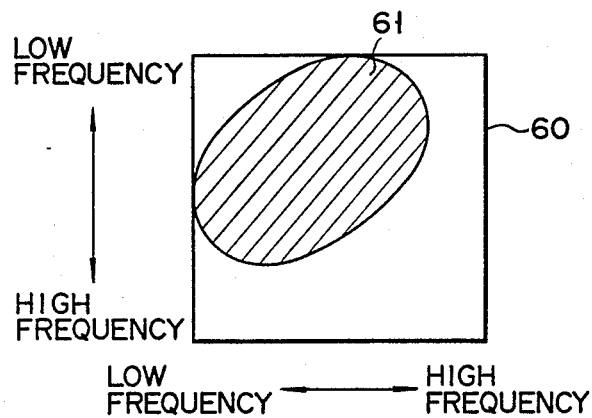
FIG. 6 is a block diagram of a transformed plane.

In the first half process at the sender side, the process sequence from the image dividing circuit 10 to the quantizer 14 may be carried out as illustrated in FIG. 5. First, an image is divided into a plurality of blocks by the image dividing circuit 10, then is subjected to variance cosine transformation by the DCT circuit 13. Then, the amount of data generated is computed using all of DCT coefficients or part thereof (e.g., all the AC components or the intermediate frequency portion 61 of the AC components shown in the transformed plane in FIG. 6), and coding bit assignment for each block is determined by the bit-assignment determining circuit 12. A multiplexed signal sent from the sender side is separated into AC and DC components in a separating circuit 22 at the receiver side, then these components are input to a decoding section 23. In this section 23 the DC component is decoded by a Huffman decoding circuit 25 based on a DC-specific Huffman table 24 similar to the one used at the sender side, and the AC component is decoded by a decoder 26 based on an AC-specific Huffman table 27 and a runlength Huffman table 28 similar to those used at the sender side. The decoded DC and AC components are combined by a combining circuit 29 and then inverse-quantized by an inverse quantizing circuit 30. The resultant signal is subjected to an inverse discrete cosine transformation, opposite to the transformation done at the sender side, by an inverse discrete cosine transformation circuit 31. The frames of the individual blocks are again combined by a frame combining circuit 32 to be restored to the original signal, and this signal is sent to a display device (such as a CRT) 33 for its display. This type of transmission/reception device is suitable mainly to transferring of a still picture.

A detailed description will be given below of the amount-of-data calculator 11 shown in FIG. 1.

A method for computing the amount of data generated for each block from the difference between the maximum and minimum values of the pixels within the block, as described earlier, will be explained referring to FIGS. 7 and 8. The pixel values of the signals from the image dividing circuit 10 at the preceding stage are sequentially compared in a comparator 71, and are arranged in the ascending or descending order (step 1). When all the pixel values of one block have been compared, the greatest pixel value and smallest pixel value in the block are selected by circuits 72 and 73, respectively, and the difference a between these values is computed ($Max - Min = a$) by a subtracter 74 (step 2). When the difference a for one block is attained, this value is stored in a memory 75 (step 3). This operation is performed for all blocks in one frame. When a process for one frame is completed (step 4), an arithmetic logic unit 76 computes the sum A (corresponding to one frame) of the differences between the maximum pixel values and the minimum pixel values, ai (i=1,..., N; N being the number of blocks in one frame) using the following equation:

$$A = \sum_{i=1}^{N} ai \quad (2)$$

The arithmetic logic unit 76 calculates, for each block, ai/A (i=1,..., N) and sends the result to bit-assignment determining circuit 12 at the succeeding stage. Based on the following equation, the circuit 12 allocates, for each block, the number of bits bi required for coding the corresponding block (step 6):

$$bi = \frac{ai}{A} \times B \quad (3)$$

where i=1,..., N, and B is the predetermined total number of coding bits in one frame and can be changed by the above-mentioned selecting circuit 34.

In the above embodiment, the amount of generated data is defined as a difference between the maximum and minimum pixel values. However, this may be defined as a power of pixel values in a block, a variance or a standard deviation.

Another embodiment of the present invention will be described below.

Figure 9:
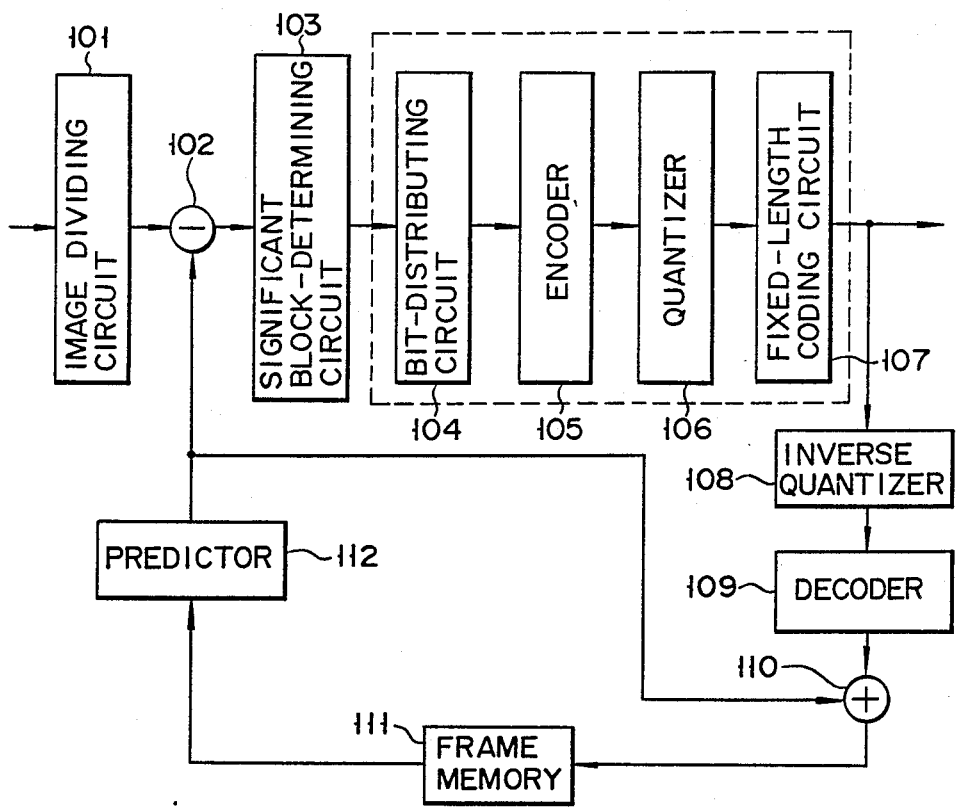
FIGS. 9 and 10 are block diagrams illustrating another embodiment of the present invention.

FIG. 9 is a block diagram of another embodiment of this invention at the sender side. A image dividing circuit 101 divides an input image into blocks (e.g., 8×8, 16×16, or the like), and a subtracter 102 calculates the difference (predicted error) between the input signal and a signal predicted by a predictor 112. The possible processes executed by the predictor may include a movement compensation, prediction between frames, prediction in a frame prediction using a background memory. The difference signal is sent to a significant-block determining circuit 103; what is to be transferred is a significant block is the one having a value above a predetermined threshold value (for example, the average luminance in a block being greater than or equal to 4). A bit-distributing circuit 104 calculates the amount of data in every specific block within one frame, and distributes the number of bits determined in advance for coding one frame in accordance with that amount of data, thereby determining the number of coding bits for each block. For each specific block, the data is coded (e.g., DCT) by an encoder 105, then is quantized by a quantizer 106, and the resultant data is subjected to fixed-length coding in a fixed-length coding circuit 107, by a process similar to the one executed by the fixed-length coding circuit 21 in FIG. 12. Thereafter, this signal is transferred to a transmission line and inverse-quantized by an inverse quantizer 108 and is decoded by a decoder 109, and the resultant signal is added, by an adder 110, to a prediction signal from the predictor 112 to reproduce the block. The reproduced block is then stored in a frame memory 111, to be used for the prediction in the predictor 112.

Figure 10:
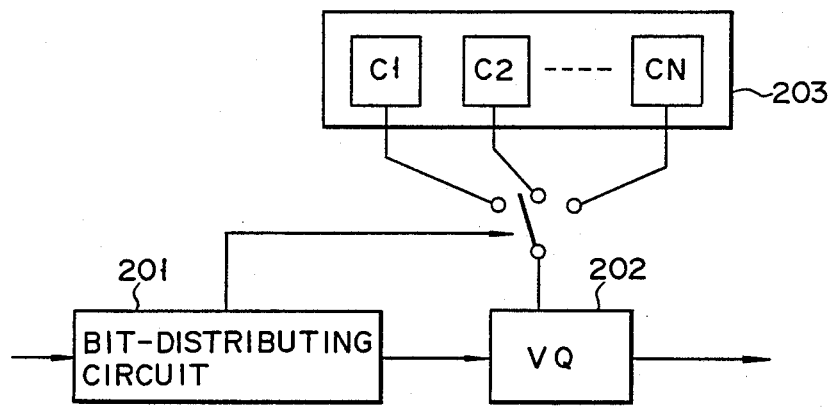

When vector quantizing (VQ) is used in data coding, the dotted portion in FIG. 9 needs only to be changed as illustrated in FIG. 10. In other words, a macro code book 203 including a plurality of code books C1, C2, ..., CN with different sizes is used, that code book which has the size represented by the number of bits closest to the number of bits determined by a bit-distributing circuit 201 is selected from the macro code book 203, and the vector quantization (VQ) is carried out by a vector quantizer 202 using this code book. In this case, it is necessary to transfer data indicating which one of code books, C1, C2, ..., or CN has been used.

Although the system described referring to FIG. 9 is mainly used to code a motion picture, the system using vector quantization VQ illustrated in FIG. 10 may be utilized for a still picture.

Figures 13, 14:
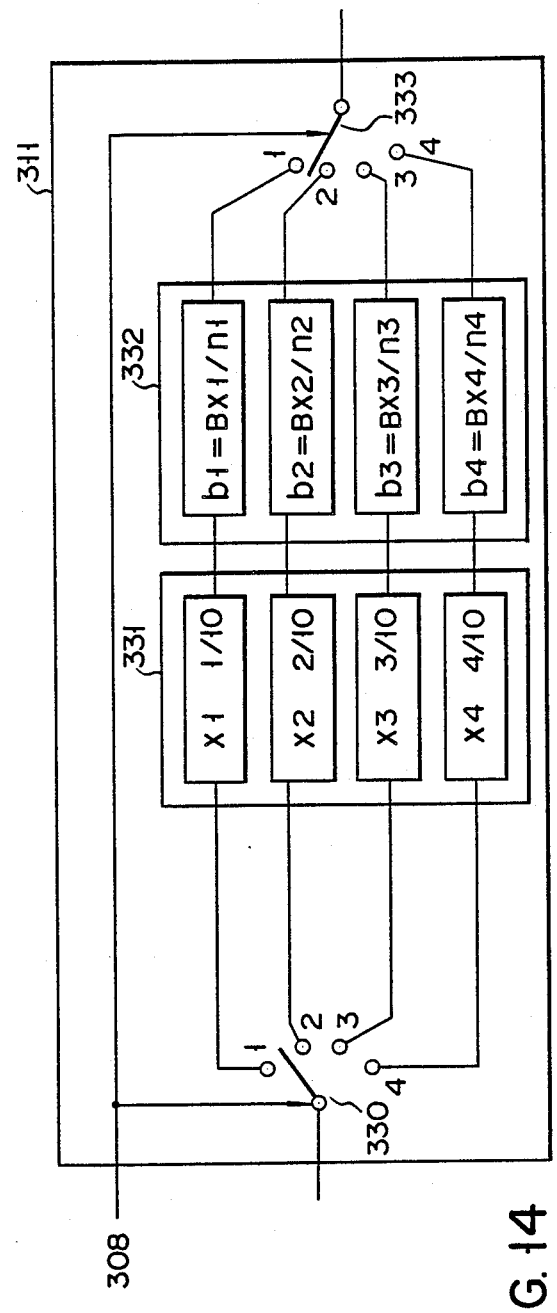
FIG. 13 is a diagram for explaining a classifying process.
FIG. 14 is a diagram for explaining the arrangement of FIG. 11.

Another embodiment of the present invention will now be described referring to FIGS. 11 through 14. FIG. 11 is a block diagram associated with this embodiment at the sender side. An image dividing circuit 301 and an amount-of-data calculator 302 are the same as those described with reference to FIG. 1. When the calculator 302 computes the amount of data within a block, a signal for one frame, representing the data amount, is sequentially stored in a memory 303. This signal is also input to a sorting circuit 304 where one frame of activity signals are sorted (step 1), and the maximum and minimum values are stored in a maximum value memory 305 and a minimum value memory 306, respectively. Using these values acquired block by block, a class forming circuit 307 prepares a class for dividing the range between the maximum and minimum values into four regions, for example. When four classes are defined, a classifying circuit 308 reads out the signal representing the amount of data from the memory 303 which has the amount of data for individual blocks per frame stored, and classifies each block into the four classes, class 1 to class 4. That is, the individual blocks 321 for one frame are classified into classes 1 to 4, as shown in FIG. 13.

In accordance with class data (1 to 4) from the classifying circuit 308, one of four bit distributions set in advance by a bit-distributing circuit 311, is selected. Based on bit distribution data (number of bits) from this circuit 311, an encoder 310 encodes the AC components contained in each block signal from the classifying circuit 308. A Huffman coding circuit 309 encodes the DC components. The coding is the same as the one explained referring to FIG. 1. These encoded data are multiplexed by a multiplexer 312 and transferred.

The bit-distributing circuit 311 will now be described referring to FIG. 14.

Contacts 1 to 4 of switches 330 and 333 are set by the classifying data determined by the classifying circuit 308 at the preceding stage. For instance, when class i (i=1, ..., 4) is selected, a bit-distributing calculator 332 computes distributed bits bi (bi=BXi/Ni; B being the total number of bits and Ni (i=1, ..., 4) being the number of blocks in each class) using data Xi (=i/10, i=1, ..., 4) from the a bit distributing section 331. The distributed bits bi for each block are then output to an encoder 310 at the succeeding stage.

According to this invention it is possible to execute a coding process of one frame within the range of a predetermined number of bits, and what is more, it is possible to suppress the occurrence of the imbalance of coding errors due to the local property in the frame as much as possible, since an adaptive bit distribution is employed which distributes a greater number of bits to the portion that has a greater amount of data generated. Even through a subjective evaluation, a high-quality reproduced image can be attained.

A still another embodiment will be described below referring to FIGS. 15 and 16.

This embodiment employs a coding system which always assures to transfer, to the receiver side, a signal (EOB signal) for distinguishing the minimum amount of data necessary for image reproduction at the receiver side, such as DC components (averaged value) or data of a block or a region, from the rest.

For each block or region, its DC components are computed, and are transferred to the receiver side after being encoded. This operation is executed for all blocks or regions, thereby providing the total number of generated bits NDC. In encoding AC components of each block or region later and transferring them to the receiver side for reproduction, it is necessary to distinguish each block or region from the rest, so that an EOB signal should be sent following one block or region. Alternatively, a head-of-block signal may be affixed to the beginning of one block or region.) This requires bits for permitting transfer of the EOB signal in coded manner for every block or region in one frame in addition to those bits required to encode the DC components. The total number of bits generated in encoding the EOB signal is denoted by NEOB.

According to the present invention, with Nall being the total amount of codes (total number of coding bits) determined in advance to encode one frame, NAC=Nall−(NDC+NEOB) is computed while the bits, NDC+NEOB, are secured, and coding bits are distributed to each block or region corresponding to this NAC in accordance with the amount of data (amount of data to represent the fineness (activity) of a picture) for each block or region. The AC components are encoded in accordance with the individual number of distributed bits.

To shorten the entire coding process time, the amount of data for each block or region may be computed in parallel at the same time the DC components are obtained.

With the above arrangement, the minimum amount of data required for reproduction of each block or region at the receiver side, such as the DC components (averaged value) of a block or region, the EOB signal for distinguishing that block or region from the rest for its reproduction are considered, and the total number of bits required for the encoding is computed in advance. The number of bits attained by subtracting the computed total number of bits from the total number of bits allocated to one frame are distributed on the basis of the amount of data of each block or region. According to this method, even if the region to be transferred is the small region having a small amount of data, such as a plane region, the DC component is transferred. As a result, an occurrence of a blank portion due to no data-transmission is prevented. Also, since the EOB signal is transmitted without fail, an error reproduction can be suppressed.

If the amount of data for each block or region is computed at the same time the DC components are obtained, this amount of data will be known at the time the DC components of all the blocks or regions in one frame are encoded and transferred to the receiver side, thus shortening the overall encoding process time.

An embodiment executing the above system is illustrated in FIG. 15. According to the embodiment, an input signal is divided into a plurality of blocks (for example, 8×8 or 16×16) by an image dividing circuit 400 and is then sent to a DC component calculator 401 where an averaged value (DC components) is computed for each block. The DC components are quantized by a DC component quantizer 402, and the quantized data is subjected to a variable-length coding (for example, Huffman coding) by a variable-length coding circuit 403. An adder 404 accumulates the number of bits used to encode the DC components encoded for the individual blocks by the coding circuit 403.

In parallel to the coding of the DC components, the amount of data (the quantity representing the fineness of a picture, such as a standard deviation or variance in a block or the absolute value of the difference between the maximum pixel value and the minimum pixel value) for each block is computed by an image density calculator 408. The image density for each block is stored in a memory 409.

For instance, the amount of data for each block is represented as ai (i=1, ..., n, n: the total number of blocks in a frame). Each ai is stored in the memory 409 and the total amount-of-data A for one frame is calculated from the following equation, as shown in FIG. 17, and is stored in the memory 409.

$$A \left( = \sum_{i=1}^{n} ai \right) \quad (4)$$

With regard to coding of AC components, after the input signal is divided into a plurality of blocks by the image dividing circuit 400, it is subjected to DCT for each block by a DCT circuit 405 and its AC components are quantized by an AC component quantizer 406 (quantization of the AC component coefficients on a DCT transformed plane). A variable-length coding circuit subjects the quantized AC components to variable-length coding for each block. In this case, the coding is executed with the number of bits assigned to each block by a bit-assignment determining circuit 410. More specifically, the total number of bits NDC of the DC components for the entire blocks of one frame which has been acquired by the adder 404 and the total number of bits NEOB required to encode the EOB signal are subtracted from the total number of bits used to encode one frame set by a mode-setting circuit 412 provided externally, and the number of bits for each block is determined by the bit-assignment determining circuit 410 from the remaining number of bits NAC based on the amount-of-data ai of each block stored in the memory 409 (for example, in proportion to the value of the amount of data) using the following equation:

$$NAC \times \frac{ai}{A} \; (i = 1, \ldots, n) \quad (5)$$

The bit-assignment determining circuit 410 will be described in detail below referring to FIG. 16. A calculator 504, which computes the total number of bits used to encode the AC components, is provided in the circuit 410 in FIG. 15. First, an adder 502 adds the total number of bits NDC of the DC components for the entire blocks in one frame, sent from the adder 404, and the number of bits NEOB sent from a number-of-bit determining circuit 501, which are used for encoding the EOB signal. (If a Huffman code for the EOB signal is determined in advance, the total number of bits required to encode the EOB signal will be specifically determined at the encoding stage.) Then, a subtracter 503 subtracts the total number of bits required to encode the DC components and the EOB signal from the total number of bits Nall, required to encode one frame and set by the mode-setting circuit 412. The number of remaining bits NAC (i.e., NAC=Nall−(NDC+NEOB)) is sent to a bit assignment determining circuit 505. This circuit 505 determines bit assignment for each block on the basis of the equation (5), using NAC, data A read out of memory 409 and ai relative to each block.

The operation of the variable-length coding circuit 407 shown in FIG. 15 will now be described referring to the flowchart given in FIG. 19. Of the individual coefficients on a transformed plane, those to be transferred to the receiver side are indicated by the slant lines in FIG. 18. A transformed plane having these coefficients are scanned in a zigzag manner and coefficients (1), (2), (3), ... along the zigzag direction are sequentially encoded and transferred. In encoding the k-th (k=1, 2, ...) coefficient, first the number of bits xk required to encode a specific coefficient x'k is computed (step 1). Then the total number of bits X required for the encoding in a block up to the present time is computed using the following equation (step 2):

$$X = \sum_{i=1}^{k} xi \quad (6)$$

The total number of bits X is compared with the number of assigning bits B for each block determined by the determining circuit 410 (step 3), and k is updated to k=k+1 and then the returns to step 1 if B≧X. If not, the coefficients up to the (k−1)-th one are transferred (step 4) and the EOB signal is added finally, thus completing the coding process for this block. The rest bits (=B−X) of the block which occur in this process is carried forward to the coding bit of the next block. As described above, the DC and AC components multiplexed by a multiplexer 411 and transferred to the receiver side.

FIGS. 20 through 23 illustrate part of a still another embodiment of the present invention (the section 420 surrounded by the dotted line in FIG. 15; the DC component and amount-of-data calculating sections).

FIG. 20 illustrates a circuit for computing the amount-of-data from a luminance plane and quantizing the DC components after execution of the DCT (executing the DCT automatically provides the DC components). As given in the description of FIG. 15, after an amount-of-data calculator 603 acquires the amount-of-data on a luminance plane for each block, the input signal is subjected to DCT by a DCT circuit 601 and only the DC components on the DCT transformed plane are quantized by the DC component quantizer 302. Through this process the DC components of the entire blocks in one frame are quantized. And the quantized DC components are then encoded and transferred as explained in the foregoing description of FIG. 15. Thereafter, the total number of bits of the AC components and the assignment of the number of bits for each block will be determined using the method explained in the foregoing description of FIG. 16.

With regard to the coding of the AC components, the input signal is again subjected to DCT by the DCT circuit 601 for each block, and is encoded in accordance with the number of bits assigned for each block and determined in advance after quantization. That is, the input signal passes twice through the DCT circuit 601 in this case.

FIG. 21 illustrates an embodiment which, unlike the one shown in FIG. 20, eliminates the necessity to cause the input signal to pass twice through the DCT circuit 601. According to this embodiment, after the input signal passes through the DCT circuit 601 once, the DC components are quantized by the quantizer 602. At the same time, the AC components are stored in a frame memory 604 for each block. When computation of the DC components and computation of the amount of data and assignment of bits to each block for the entire one frame are all completed, the AC components are read out from the frame memory 604 block by block, sent to the subsequent quantizer (406 in FIG. 15) for quantization, then encoded. According to this method, although DCT need to be carried out once for each block, a frame memory for one frame is separately necessary at the succeeding stage of the DCT circuit.

FIG. 22 illustrates a circuit for computing the DC components and amount of data after the DCT is executed. The signal divided into a plurality of blocks is first subjected to DCT for each block by the DCT circuit 601, and only the DC components are quantized by the quantizer 602. As the amount of data discussed here is the quantity indicating the fineness of a picture in a bock as mentioned earlier, the amount of data may be determined by checking the degree of occurrence of the high-frequency components in the DCT transformed plane. That is, the amount of data here would be attained if the AC component power after execution of DCT is calculated.

With regard to the coding of the AC components, after the computation of the DC components and amount of data for the individual blocks is completed, the input signal is again subjected to DCT for each block by the DCT circuit 601 before quantization. The quantized signal is then encoded with bits determined for each block. In other words, the input signal should pass through the DCT circuit 601 twice as in the case of FIG. 20.

FIG. 23 illustrates an embodiment which, unlike the one shown in FIG. 22, eliminates the necessity to cause the input signal to pass through the DCT circuit 601 twice. According to this circuit, after the input signal passes through the DCT circuit 601 once, the DC components for each block are quantized by the quantizer 602 and the amount of data is computed by the image density calculator 603. The AC components are stored in a frame memory 604. When all the processes for the DC components and the amount of data for the entire one frame are completed, the transformed coefficients (AC components) are sent from the frame memory 604 block by block to the subsequent quantizer (406 in FIG. 15) for quantization. According to this method, although DCT need to be carried out once, a frame memory for one frame is separately necessary at the succeeding stage of the DCT circuit as in the case of FIG. 21.

With regard to the coding of the AC components after the computation of the DC components and amount of data described referring to FIGS. 20 to 23, the total number of bits for the DC components attained for the blocks in one frame and the total number of bits required to encode the EOB signal are added, as explained in the foregoing description of FIGS. 15 and 16. Then, the resultant number of bits are subtracted from the total number of bits for the entire one frame, and the number of remaining bits are assigned to the individual blocks in proportion to the amount of data of the blocks. The AC components of individual blocks are encoded using the assigned bits.

Through the above process sequence, the coding for the entire one frame will completed with the total number of bits predetermined.

According to the embodiments shown in FIGS. 20 to 23, only the DC components are quantized by the quantizer 602 and sent to the receiver side. It is also possible to use a system for ensuring to always encode and transmit part of the AC components (e.g., low-frequency AC components) in addition to the DC components. Alternatively, the DC components may be attained by the luminance plane, and the amount of data may be attained after the DCT is executed, unlike the cases of FIGS. 20 to 23.

The aforementioned embodiments ensure encoding and transfer of the minimum data necessary for image reproduction at the receiver side such as the DC components or the EOB signal, for each block or region. With regard to the other data, the total number of bits required for the minimum necessary data are subtracted from the total number of bits determined for the encoding of one frame in advance, and the coding process is executed using the remaining bits. Accordingly, the coding of the entire one frame can be done using the predetermined number of bits. Further, with regard to those blocks and regions whose amount of data are low, and which have a smaller number of bits assigned as a consequence, particularly, flat-image regions, it is possible to prevent data of those regions from being not at all transferred to the receiver side, thus producing a blank portion in the reproduced image (this condition occurs when a number of bits less than the number of bits required for transmitting minimum necessary data is assigned to a block), or prevent the EOB signal from being in correctly transferred to the receiver side, thus performing an erroneous reproduction.

If the amount of data is computed for each block or region in parallel to the computation of the DC components, the coding process time can be shortened.

A description will now be given of a further embodiment in which the present invention is applied to a color image.

In a color image coding apparatus, a color image is divided into predetermined color components, such as R, G and B signals or luminance and color difference signals. The amount of data of these signal components are calculated, and based on the resultant data, the amount of codes required for encoding each signal component or the distribution of the ratio thereof is set. Each signal component is encoded based on the amount of codes distributed for each signal component or ratio.

Prior to encoding, the input image which represent the R, G and B signals or luminance and color difference signal are divided into blocks, and the amount of data for each block is computed on the basis of the variance, standard deviation or the absolute value of the difference between the maximum and minimum pixel values in a block, or the result of filtering a block (e.g., using a band pass filter in consideration of the human visual characteristic), or part of the transformation coefficients in the case of the individual blocks being orthogonal-transformed, or the sum of the absolute values or power of all the transformation coefficients (weighting may be done to part of the coefficients in view of the visual characteristic). The average value of the amount of data over the entire one frame is taken as the amount of data of the R, G and B signals of the input image or luminance and color difference signals. The amount of data over one frame are not averaged but may be summed. Based on the ratio of the data (for example, R:G:B or luminance signal:color difference signal), the number of coding bits of each of the R, G and B signals or the luminance signal and the color difference signal, or the ratio thereof is determined. For instance, given "amount of data of the luminance signal "/" the amount of data of the color difference signal"=X, the distribution ratio Y between the number of bits of all the luminance signal and that of all the color difference signal may be determined by Y=f(X) (f being a predetermined function).

The actual coding process will proceed based on the number of bits determined in the above-described manner or the ratio thereof In this case, it is possible to employ a method of always completing the coding process of a signal within the determined number of bits or the ratio thereof. Even if the coding process should proceed beyond the determined number of bits or the ratio thereof, a method may be employed which executes a process of making the excess portion to fall within a predetermined range.

Further, of the color difference signals, the R−Y signal and B−Y signal, for example, give different impacts on human eyes; the former signal is easier to detect than the latter one. In assigning the amount of codes, therefore, it is possible to give the R−Y signal greater weighting than the B−Y signal.

In computing the amount of data of each signal, the average value of the amount of data for each block is used; however, one frame may be considered as a large one block so that the amount of data of this frame can be computed at a time instead of doing the computation for averaging data of each block.

Figure 24:
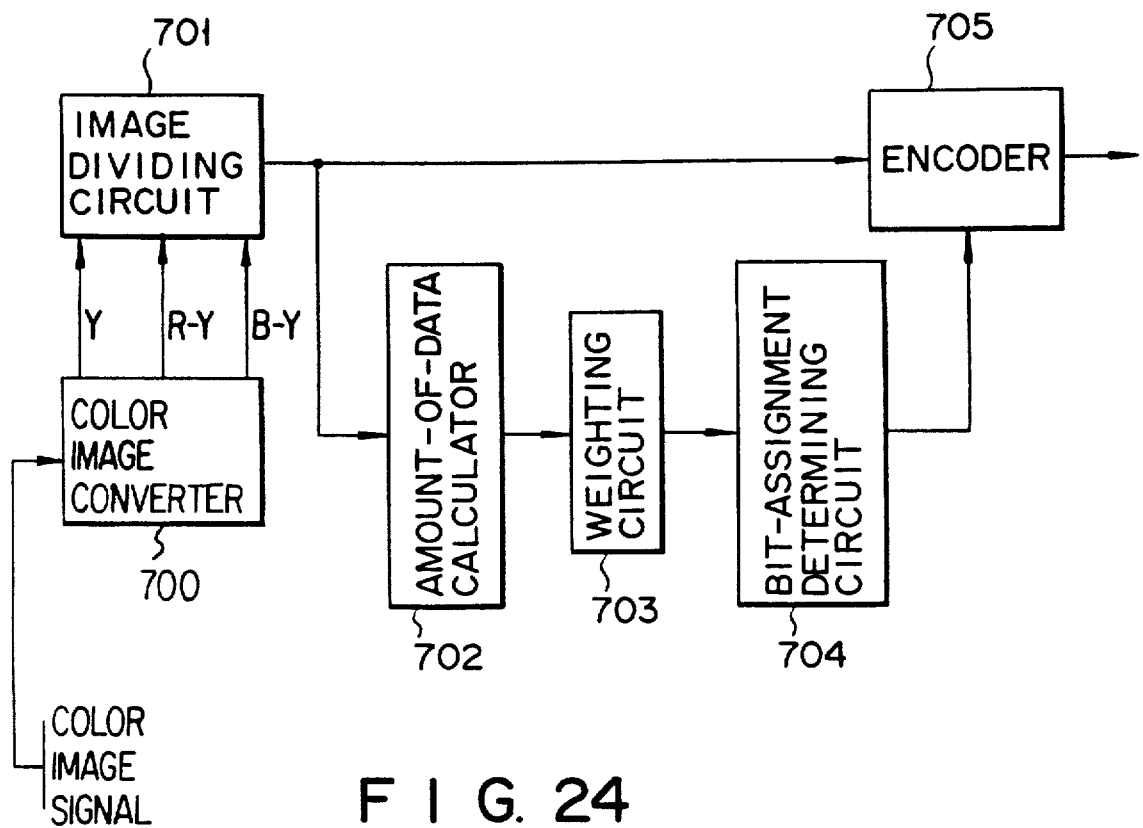
FIG. 24 is a block diagram illustrating of an image coding apparatus according to another embodiment of the present invention.

According to the embodiment shown in FIG. 24 which deals with a color image, an input image (individual signals, such as Y, R−Y and B−Y) supplied from a color image converter 700 for converting a color image signal into image signal components is divided into a plurality of blocks each having a predetermined number of pixels (e.g., 8×8 pixels or 16×16 pixels) by an image dividing circuit 701, and the amount of data for each block is computed in an amount-of-data calculator 702.

The amount of data may be defined by the variance (standard deviation) of the pixel values in a block or the absolute value of the difference between the maximum pixel value and the minimum pixel value. These are averaged over one frame to compute the final amount of data of each signal component. A weighting circuit 703 gives weight to the amount of data of each signal component in view of the visual characteristic. Assuming that the amount of data of the luminance signal is AY, the amount of data of the color difference signal is AC
(the amount of data of R−Y and B−Y being AR−Y and AB−Y, respectively; i.e., AC=AR−Y+AB−Y), then the values after weighting would be $\alpha$AY and $\beta$AC (for example, $\alpha$:$\beta$=2:1, 3:1). With regard to R−Y and B−Y, with the weighting taken into consideration, their values after weighting would be pAY, qAR−Y and rAB−Y (for example, p:q:r=10:3:2).

There may be a system without the weighting circuit 703. In this case, $\alpha$ and $\beta$ or p, q and r should be all 1. A bit-assignment determining circuit 704 determines the assignment of the number of bits to each signal component based on the amount of weighted data. Given that the total amount of codes is denoted by Ball (which is a value obtained by subtracting NDC +NEOB from Nall as described referring to FIG. 16), the amounts of codes for the luminance and color difference signals (R−Y, B−Y) are respectively BY and BC (BR−Y, BB−Y), the number of bits for each signal component will be determined by the following equations:

$$BY = Ball \times \frac{pAY}{pAY + qAR\text{-}Y + rAB\text{-}Y}$$

$$BR\text{-}Y = Ball \times \frac{qAR\text{-}Y}{pAY + qAR\text{-}Y + rAB\text{-}Y}$$

$$BB\text{-}Y = Ball \times \frac{rAB\text{-}Y}{pAY + qAR\text{-}Y + rAB\text{-}Y}$$

Or the numbers of bits for the luminance and color difference signals can be determined by the following equations. (It is possible to further weight R−Y and B−Y in C, then determine the numbers of bits for the first two separately.)

$$BY = Ball \times \frac{\alpha AY}{\alpha AY + \beta AC}$$

$$BC = Ball \times \frac{\beta AC}{\alpha AY + \beta AC}$$

Figure 25:
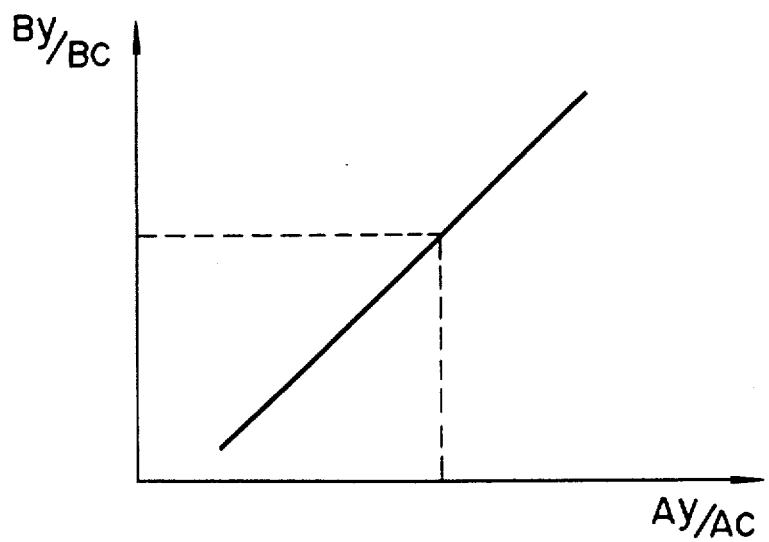
FIG. 25 is a diagram illustrating a straight line for determining the ratio of bit distribution to luminance and color difference signals from the ratio of the amount of data of luminance signal and color difference signal.

As another method of determining the number of bits, the ratio of the amounts of data may be used in the following manner. A straight line (or a curve) is determined as shown in FIG. 25, and the ratio of the amounts of data of Y and C, AY/AC, is taken on the horizontal scale and the ratio of the numbers of bits thereof, BY/BC, on the vertical scale. BY/BC is specifically determined by selecting AY/AC on this straight line (or curve). (See the dotted line in FIG. 25). The straight line (or curve) may or may not pass through the origin. The slope of the straight line is determined in consideration of the visual characteristic and may be altered in accordance with a picture to be treated.

A similar process can be also executed if the number of bits is determined based on the R, G and B signals, and R, G and B may be weighted to be 2:3:1.

An encoder 705 performs various coding process such as DCT (discrete cosine transformation), VQ (vector quantization) and DPCM, o variable-length coding. This encoder determines the number of coding bits for each block on the basis of the number of bits determined for each signal component by the bit-assignment determining circuit 704. For instance, the number of coding bits, bi (i=1, ..., N: N represents the total number of blocks of Y signal), for each block of the Y signal may be determined by:

$$bi = BY \times \frac{ai}{AY \times N}$$

where ai is an amount of data of i-th block.

In actual coding, it is possible to employ a method of always completing the coding process within bi. Even if the coding process should proceed beyond the determined number of bits, a method may be employed which executes a process of making the excess portion to fall within a predetermined range.

The number of bits for each signal component is determined in advance in this example. Alternatively, with only the ratio of the numbers of bits for each signal component being determined in advance, the coding process may be executed with this ratio as the reference (i.e., the coding is done to fully satisfy the reference or not to significantly deviate from it). In other words, although the numbers of bits actually used varies, their ratio is always constant or nearly constant.

In this embodiment an image is divided into blocks by the image dividing circuit 701; however, one frame for each signal component may be considered as a large one block so that the amount of data of this frame can be computed at a time instead of doing the computation for each block. In this case, the image is divided into blocks at the preceding stage of the encoder 705 as needed. In some case, it may not be necessary to divide an input image into blocks.

Figure 26:
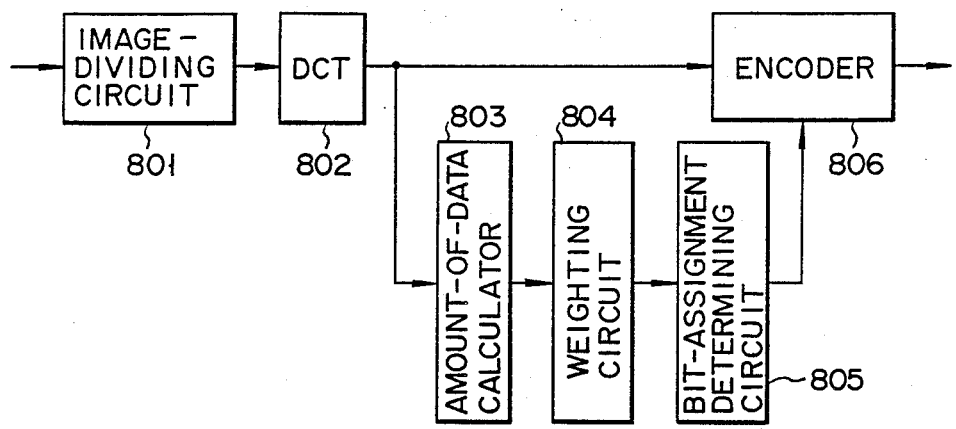
FIG. 26 is a block diagram illustrating of an image coding apparatus according to a still another embodiment of the present invention.
Figure 27:
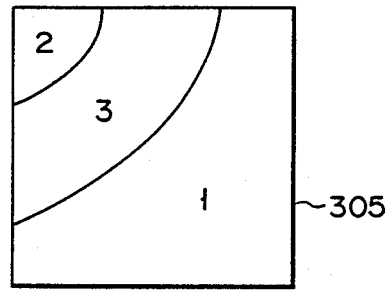
FIG. 27 is a diagram exemplifying the weighting of the individual coefficient on a DCT transformed plane.

According to a still another embodiment shown in FIG. 26, the individual signals (R, G and B or Y and C) are divided into blocks by an image dividing circuit 801, and the resultant data is subjected to DCT in a DCT circuit 802. Then, an amount-of-data calculator 803 computes the amount of data for each block; in this embodiment, the amount of data is computed by the sum of the absolute values of the individual DCT transformation coefficients in one block, or power. A weighting circuit 804 executes a weighting process in consideration of the visual characteristic; in this example, it is possible to alter the weighting factors in accordance with the frequency regions of a transformed plane as shown in FIG. 27. (In FIG. 27, a greater weighting is given to the middle-frequency region to match the visual characteristic.) Although the amount of data may be attained from all of the transformation factors, only part of the transformation factors may be used instead. In this case, the values of those of the weighting factors shown in FIG. 27 which belong to the regions that are not used, needs to be set to 0.

Thereafter, a bit-assignment determining circuit 805 determines bit assignment or the ratio of the bit assignments; this process is the same as the one executed in the embodiment shown in FIG. 24. An encoder 806 performs a coding process following a DCT process, using the determined numbers of bits or their ratio as a reference. At a time, the number of coding bits is determined for each block.

Figure 28:
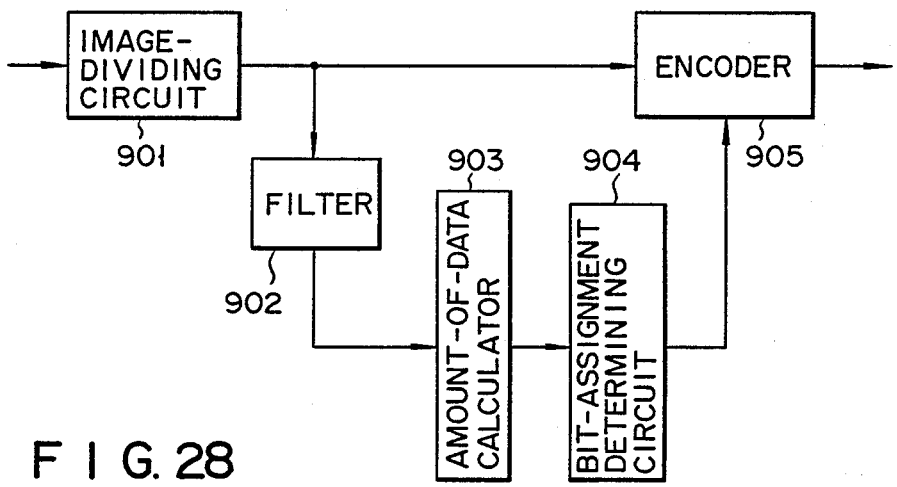
FIG. 28 is a block diagram of an image coding apparatus according to a further embodiment of the present invention.

According to a still another embodiment shown in FIG. 28, after an input signal is divided into blocks by an image dividing circuit 901, the resultant data is filtered by a filter 902 (which may be a band pass filter to pass the middle-frequency component of, for example, about 3 MHz in view of the visual characteristic). An amount-of-data calculator 903 then performs the same process as done by the embodiment of FIG. 24, on the filtered individual pixel values to thereby compute the amount of data. This amount of data is averaged over one frame to be a final amount of data for each associated signal component. A bit-assignment determining circuit 904 then determines the number of bits (or the ratio of the numbers of bits) for each signal component, based on which an encoder 905 executes a coding process.

Although in this embodiment it is considered that weighting has already been given to the middle frequency due to the filtering done by the band pass filter, no further weighting is actually done, such weighting may be given at the succeeding stage of the calculator 903. In this case, the final amount of data is determined on the basis of the amount of data attained after the execution of the weighting.

According to the above color signal coding system, the numbers of bits for encoding the individual signal components can be assigned (or the ratio of the numbers of bits may be determined) in view of the amount of data (fineness of a picture) of each signal component (R, G or B signal, or luminance or color difference signal) and the impact of these signals on a human visuality. Accordingly, a reproduced image with an excellent visual characteristic can always be attained, regardless of the fineness of the input image.

A still another embodiment will be described below referring to FIG. 29.

The output terminal of an image dividing circuit 1001 which receives an input signal is connected to a DCT circuit 1002, a DC component quantizer 1003 and an activity circuit 1004 that computes the amount of data. The term "activity " means the amount of data which represents the fineness of the picture.

The output terminal of the DC component quantizer 1003 is connected to a DPCM circuit 1006, which subtracts the value obtained by quantizing the average value of a preceding block from that of a current block, to output a difference signal. The output terminal of the DPCM circuit 1006 is connected to a DC component coding circuit 1007, which codes the difference signal output of the DPCM circuit 1006 in accordance with Huffman code table prepared in a Huffman table 1008. In this case, the total number of coding bits required for coding the DC components of all blocks (of Y and C signals) are computed. Also, the assignment of coding bits for each block is performed in parallel with the number-of-bits computation.

The output of the activity circuit 1004 is coupled to an α determining circuit 1009 and Y,C bit distribution determining circuit 1010. The activity circuit 1004 computes, for each other block of Y and C signal frames, an amount of generated data (fineness of a picture) on the basis of the variance (standard deviation) of pixel values, power, the sum of absolute values, output filtered by a band pass filter, etc. The activity circuit 1004 stores the resultant data, and computes, at a time, an amount of data of the entire one frame for each of the Y and C signals and the amount of data of the entire image including the Y and C signals and stores the resultant data. The output terminals of the α determining circuit 1009 and quantization table 1011 is connected to a multiplier 1012, the output terminal of which is connected to a AC component quantizer 1005. The quantization table 1011 includes a plurality of step sizes each prepared for each of coefficients obtained by DCT.

The AC component quantizer 1005 quantizes the AC component of each DCT coefficient in accordance with the step size obtained by multiplying the step size data from the quantization table 1011 by α. The factor 60 is conventionally determined in accordance with the amount of data of each image detected by the activity circuit 1004. The step sizes prepared in the quantization table are increased or decreased in correspondence with α. In other words, the factor α is determined in correspondence with the fineness of picture of one frame, and the step size for quantization is determined by the value obtained by multiplying the step size data output from the quantization table 1011 by α.

The AC component quantizer 1005 quantizes the AC component of each DCT coefficient in accordance with the determined step size, to output the quantized signal to the AC component coding circuit 1013. The quantized signal is coded by the AC component coding circuit 1013, using the Huffman code table prepared in the Huffman table 1014. In this case, the quantized signal of each block is coded by the bits within the number of coding bits determined for each block by a block bit distribution determining circuit 1015 as described with relation to the fixed length coding circuit 17 of FIG. 1.

The activity circuit 1004 outputs the amount-of-data of the entire one frame of each of the Y and C signals to the Y,C bit-distribution circuit 1010. As described referring to FIG. 16, the Y,C bit-distribution circuit 1010 subtracts the number of bits required for coding the average values of all blocks (Y and C) output from the DC coding circuit 1007 and the number of bits required for transmitting the EOB signals from the entire number of bits of the image, to obtain the rest number of bits. Then, the number of coding bits to be distributed to the Y and C signals or its ratio is determined as described referring to FIG. 25.

The block bit distribution determining circuit 1015 determines the number of coding bits of each block from the ratio of the amount of data of all of the Y or C signal in respect to the the amount of data of each block, on the basis of the amount of generated data of each block of the Y and C signals which has been obtained by the activity circuit 1004. The number of coding bits distributed to the i-th block of the Y signal, for example, is determined by the following formula.

$$BY \times \frac{ai}{AY}$$

where BY is the number of coding bits distributed to al signal components of the Y signal, ai is an amount of generated data of each block of the Y frame signal (i=1, ..., N, N: the entire number of blocks of the $$AY = \sum_{i=1}^{N} ai.$$

The determined number of bits to be distributed to each block outputs to the AC component coding circuit 1013, in which the quantized signal is coded by the bits within the determined number of coding bits in accordance with the bit distribution to each block of the Y and C signals. When the quantized signals of one frame are coded within the entire number of bits preset for the entire one frame, the coding is completed.

The coded signal is supplied to a multiplexer 1016, which multiplexes the output signals output from the DC component coding circuit 1007 and the AC component coding circuit 1013, and outputs the multiplexed signal to a transmission line.

What is claimed is:

1. An image coding apparatus comprising:
    image dividing means for dividing an image signal of a predetermined unit into a plurality of blocks;
    amount of-data calculating means, coupled to said image dividing means, for computing an amount of data representing fineness of a picture and included in each of said blocks;
    bit-assignment determining means, coupled to said amount-of-data calculating means, for determining a number of coding bits to be used to assign a predetermined total number of coding bits allowable for encoding said image signal of said predetermined unit to each of said blocks in accordance with said amount of data of said each blocks;
    quantizing means for quantizing said image signal for each of said blocks and outputting a quantization block signal; and
    encoding means, coupled to said quantizing means, for encoding said quantization block signal in accordance with said determined number of coding bits.

2. An apparatus according to claim 1, wherein said image signal is an image signal of one of one field and one frame constituted by a number of pixel signals, and said amount-of-data calculating means calculates variance and standard deviation of pixel values in each of said blocks of said image signal for each of said blocks to thereby compute said amount of data.

3. An apparatus according to claim 1, wherein said image signal is an image signal of one of one field and one frame having a number of pixel values, and, for each of said blocks, said amount-of-data calculating means calculates a difference between maximum and minimum values of the pixel values in said each block of said image signal to thereby compute said amount of data.

4. An apparatus according to claim 3, wherein said amount-of-data calculating means comprises:
    comparing means for sequentially comparing values of pixels contained in each of said blocks with each other to arrange said pixel values in an ascending or descending order;
    selecting means for selecting a maximum pixel value and a minimum pixel value when all pixels in each of said blocks are arranged; and
    means for calculating a difference between said maximum and minimum pixel values to thereby determine said amount of data from said difference.

5. An apparatus according to claim 1, wherein said bit-assignment determining means determines the number of coding bits to be assigned to each of said blocks from a ratio between a total amount of data attained by accumulation of an amount of data of each of said blocks for one of one field and one frame and said amount of data of each of said blocks and said total number of coding bits.

6. An apparatus according to claim 1, wherein said encoding means subjects said quantization block signal to Huffman coding.

7. An apparatus according to claim 1, wherein based on said number of coding bits determined for each of said blocks by said bit-assignment determining means, said encoding means subjects said quantization block signal to Huffman coding within said number of bits and executes such a coding process for all of said blocks of one of one field and one frame, thereby ensuring execution of a coding process of the entire one of one field and one frame within said total number of coding bits for one of one field and one frame.

8. An apparatus according to claim 1, wherein said encoding means includes means for computing a difference between said number of coding bits for each of said blocks and a number of coding bits actually needed to encode said each block, adding remaining bits to a number of coding bits for an ext block to be encoded, and encoding said next block to be encoded using a resultant number as a new number of coding bits.

9. An apparatus according to claim 1, wherein said amount-of-data calculating means subjects an image signal of each of said blocks to discrete cosine transformation, and computes an amount of each of said blocks from one of an entire transformation coefficient signal resulting from said discrete cosine transformation and part thereof.

10. An apparatus according to claim 1, wherein said amount-of-data calculating means comprises:
    a predictor for outputting a prediction signal;
    means for computing a difference between said prediction signal from said predictor and an image signal of each of said blocks from said image dividing means;
    means for selecting a specific block to be actually encoded from a relationship between said difference and a predetermined threshold value; and
    means of computing an amount of data only from said specific block.

11. An apparatus according to claim 1, wherein said quantizing means comprises vector quantizing means for selecting one of several kinds of predetermined code books and using said selected code book for vector quantization of said image signal for each of said blocks in accordance with said number of bits determined by said bit-assignment determining means.

12. An apparatus according to claim 1, wherein said amount-of-data calculating means comprises:
    means for computing amounts of data of all of said blocks in one of one field and one frame and detecting amounts of data indicating maximum and minimum values among said computed amounts of data;
    means for separating a range between said maximum amount of data and said minimum amount of data, into a predetermined number of classes;

classifying means for classifying said blocks into associated ones of said predetermined number of classes by checking said amount of data for each of said blocks; and means for outputting a predetermined, fixed amount of data corresponding to each of said classes to said bit-assignment determining means as a new amount of data for said blocks classified into said each class.

13. An image coding apparatus comprising:

image dividing means for dividing an image signal of a predetermined unit into a plurality of blocks;

amount-of-data calculating means for computing an amount of data representing fineness of a picture and included in each of said blocks;

bit-assignment determining means for determining a number of coding bits to be used to assign a predetermined total number of coding bits allowable for encoding said image signal of said predetermined unit to each of said blocks in accordance with said amount of data of said each blocks;

quantizing means for quantizing said image signal for each of said blocks and outputting a quantization block signal; and encoding means for encoding said quantization block signal within said determined number of coding bits for each of said blocks, thereby ensuring execution of a coding process within said total number of coding bits.

14. An image coding apparatus comprising:

image dividing means for diving an image signal of one of one frame and one field into a plurality of blocks, said image signal including DC and AC components;

amount-of-data calculating means, coupled to said image dividing means, for computing an amount of data contained in each of said blocks;

first quantizing means, coupled to said image dividing means, for quantizing said DC components of said image signal for each of said blocks and outputting a DC component quantization signal;

coding bit adding means for accumulating numbers of coding bits required to encode said quantization signal for all of said blocks within one of one field and one frame;

bit-assignment determining means, coupled to said amount-of-data calculating means, for computing an umber of coding bits left by subtracting the number of coding bits required to encode the DC components for all of said blocks in said one of one field and one frame from the total number of coding bits determined in advance to encode said image signal of said one of one field and one frame, and for determining the number of coding bits to be assigned to coding of the AC components of each of said blocks in accordance with said computed number of bits left and an amount of data of said each block;

second quantizing means, coupled to said image dividing means, for quantizing said AC components included in said image signal, and outputting an AC component quantization signal; and encoding means, coupled to said bit-assignment determining means and said second quantizing means, for encoding said AC component quantization signal in accordance with said determined number of bits.

15. An apparatus according to claim 14, wherein said encoding means subjects said quantization signals to Huffman coding.

16. An apparatus according to claim 14, wherein said second quantizing means comprises means for subjecting an image signal of each of said blocks to discrete cosine transformation and quantizing a transformation coefficient signal resulting from said discrete cosine transformation.

17. An apparatus according to claim 14, wherein said encoding means transfers the AC components of each of said blocks from those AC components which are significant from a view point of value evaluation or subjective evaluation or stops transferring of said AC components from those AC components which are insignificant, and, when a number of coding bits assigned in advance to each of said blocks is reached, said encoding means stops encoding of an associated block, and executes this encoding process for all of said blocks within one frame, thereby ensuring encoding of said image signal within a total number of coding bits determined in advance for one frame.

18. An image coding apparatus according to claim 14, wherein said bit-assignment determining means subtracts one of first, second, and third numbers of bits, the first number of bits being required for encoding said DC components of each of said blocks, the second number of bits being needed to encode a signal that is required for reproduction at a receiver side, and the third number of bits being needed to encode a signal attained by adding a signal that is required for reproduction at said receiver side and part of a different signal, from the total number of coding bits assigned to one frame, and distributes remaining coding bits as coding bits for said AC components of each of said blocks in accordance with said amount of data of said each block.

19. An apparatus according to claim 14, wherein said apparatus is designed to execute quantization and encoding of said DC components and a process for computing an amount of data in parallel simultaneously.

20. A color image coding apparatus comprising:

converting means for converting a color image signal into predetermined image signal components;

amount-of-data calculating means for computing an amount of data of each of said predetermined image signal components acquired by said converting means;

bit-assignment determining means for distributing a total number of coding bits assigned in advance to said color image signal to each of said image signal components as a number of coding bits used to encode said each image signal component in accordance with said amount of data of said each image signal component computed by said amount-of-data calculating means; and means for encoding each of said image signal components using said number of coding bits distributed by said bit-assignment determining means.

21. An apparatus according to claim 20, wherein said amount-of-data determining means has means for performing a weighting process in consideration of a visual characteristic at a time said amount of data of each of said image signal components is acquired and setting an amount of data after said weighting process as a final amount of data of said each image signal component.

22. An apparatus according to claim 20, wherein said amount-of-data calculating means divides each of said image signal components into a plurality of blocks, computes an amount of data for each of said blocks, repeats this computation for all of the blocks of one frame of said each image signal component, then averaging resultant amounts of data for said each image signal component to thereby determine an amount of data of said each image signal component.

23. An apparatus according to claim 20, wherein when said image signal components have Y and color difference signal components, Y is given a highest weight, and when said image signal components have R, G and B signal components, G is given a highest weight.

24. An image coding apparatus comprising:
   image dividing means for dividing an image signal of a predetermined unit into a plurality of blocks to output a data signal for each of said blocks;
   amount-of-data calculating means, coupled to said image dividing means, for computing an amount of power of a middle frequency component included in each of said blocks;
   bit-assignment determining means, coupled to said amount-of-data calculating means, for determining the number of coding bits to be assigned to each of said blocks in accordance with said amount of power of said each block;
   quantizing means for quantizing and said data signal for each of said blocks and outputting a quantization block signal; and
   encoding means, coupled to said quantizing means, for encoding said quantization block signal in accordance with said determined number of bits.

25. An image coding apparatus comprising:
   image dividing means for dividing an image signal of one of one frame and one field into a plurality of blocks;
   amount-of-data calculating means, coupled to said image dividing means, for computing an amount of data contained in said each of said blocks;
   first quantizing means, coupled to said image dividing means, for quantizing, for each of said blocks, a specific signal required for decoding of said each block and outputting a quantization signal;
   coding bit adding means for accumulating numbers of coding bits required to encode said quantization signal for all of said blocks within one of one field and one frame;
   bit-assignment determining means, coupled to said amount-of-data calculating means, for computing a number of coding bits left by subtracting the number of coding bits required to encode said specific signal for all of said blocks in said one of one field an one frame from the total number of coding bits determined in advance to encode said image signal of said done of one field and one frame, and for determining the number of coding bits to be assigned to coding of AC components of each of said blocks in accordance with said computed number of bits left and an amount of data of said each block;
   second quantizing means, coupled to said image dividing means, for quantizing said AC components included in said image signal, and outputting an AC component quantization signal; and
   encoding means, coupled to said bit-assignment determining means and said second quantizing means, for encoding said AC component quantization signal in accordance with said determined number of bits.

* * * * *

UNITED STATES PATENT AND TRADEMARK OFFICE
CERTIFICATE OF CORRECTION

PATENT NO. : 4,984,076

DATED : January 8, 1991

INVENTOR(S) : Toshiaki Watanabe, et al

It is certified that error appears in the above-identified patent and that said Letters Patent is hereby corrected as shown below:

Figures 24-25 should be deleted to appear as per attached sheet.

Signed and Sealed this

Twenty-second Day of June, 1993

*Attest:*

MICHAEL K. KIRK

*Attesting Officer*     Acting Commissioner of Patents and Trademarks